United States Patent
Feldpausch et al.

(10) Patent No.: US 6,739,096 B2
(45) Date of Patent: May 25, 2004

(54) MOVABLE OFFICE SUPPORT SYSTEM

(75) Inventors: Thomas G. Feldpausch, Hastings, MI (US); Carl V. Forslund, III, East Grand Rapids, MI (US); Mark A. Baloga, East Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 50 days.

(21) Appl. No.: 09/888,069

(22) Filed: Jun. 22, 2001

(65) Prior Publication Data

US 2002/0194792 A1 Dec. 26, 2002

(51) Int. Cl.[7] .................................................. A49H 1/10
(52) U.S. Cl. ........................... 52/36.1; 52/29; 248/327; 248/333
(58) Field of Search ................................. 248/327, 333, 248/298.1, 918; 52/36.1, 36.2, 29, 733.1

(56) References Cited

U.S. PATENT DOCUMENTS

| | | |
|---|---|---|
| 119,054 A | 9/1871 | Shryock |
| 241,925 A | 5/1881 | Cadwell |
| 249,198 A | 11/1881 | Moon |
| 253,538 A | 2/1882 | McLane |
| 475,126 A | 5/1892 | Lorenz |
| 549,347 A | 11/1895 | Clark |
| 605,148 A | 6/1898 | Sylvester |
| 621,835 A | 3/1899 | MacDonald |
| 627,396 A | 6/1899 | Daly |
| 713,417 A | 11/1902 | Feldmann, Jr. et al. |
| 821,144 A | 5/1906 | Walsh |
| 943,821 A | 12/1909 | Feldmann, Jr. |
| 950,006 A | 2/1910 | McCarty |
| 955,586 A | 4/1910 | Emerich |
| 997,866 A | 7/1911 | Smith |
| 1,086,236 A | 2/1914 | Staples |

(List continued on next page.)

FOREIGN PATENT DOCUMENTS

| | | |
|---|---|---|
| AT | 164466 | 11/1949 |
| DE | 232680 | 3/1964 |
| DE | 1 561 580 | 4/1970 |
| DE | 3132015 | 10/1982 |
| GB | 124334 | 3/1919 |
| GB | 2127682 | 4/1984 |
| JP | 3-93944 | 4/1991 |
| JP | 3-93946 | 4/1991 |

OTHER PUBLICATIONS

Progetto 25.90, cover and inside page of brochure along with pp. 12–13, bearing a date designation of 1991.

U.S. patent application titled Workstation, U.S. application No. 09/183,023 filed on Oct. 30, 1998; 106 pages, Figures 1–33 listing inventors Mark A. Baloga and Carl V. Forslund III.

(List continued on next page.)

Primary Examiner—Carl D. Friedman
Assistant Examiner—Basil Katcheves
(74) Attorney, Agent, or Firm—Foley & Lardner

(57) ABSTRACT

A movable support system for at least one display device is disclosed having a track system and a base movably mounted at a first section to the track system. A display support assembly adapted for coupling of the display device is pivotally mounted at a second section of the base. The display device installed on the display support assembly may be selectively positioned for use in a variety of locations relative to the track system. An apparatus is also disclosed providing a movable support for a display device, including a track system providing at least one track and a support movably coupled at a first section to the track system. The apparatus also includes a display support movably coupled to a second section of the support and configured for coupling at least two display panels. Each of the display panels may be positioned for use in a variety of locations relative to the track.

74 Claims, 9 Drawing Sheets

U.S. PATENT DOCUMENTS

| | | | |
|---|---|---|---|
| 1,116,484 A | 11/1914 | Ralph | |
| 1,122,926 A | 12/1914 | Hick | |
| 1,141,404 A | 6/1915 | Moseley | |
| 1,203,659 A | 11/1916 | Smith | |
| 1,254,036 A | 1/1918 | Grant | |
| 1,326,832 A | 12/1919 | Baily | |
| 1,457,990 A | 6/1923 | Morgan | |
| 1,599,888 A | 9/1926 | Haskell | |
| 1,688,456 A | 10/1928 | Dolph | |
| 1,770,755 A | 7/1930 | Kleinpell | |
| 1,826,469 A | 10/1931 | Hunt et al. | |
| 1,881,636 A | 10/1932 | Johnson et al. | |
| 1,887,539 A | 11/1932 | Brown | |
| 1,943,629 A | 1/1934 | Schwartz | |
| 1,958,579 A | 5/1934 | Johnson et al. | |
| 2,070,408 A | 2/1937 | Leidgen | |
| 2,144,083 A | 1/1939 | Rentfrow, Sr. | |
| 2,182,703 A | 12/1939 | Rainwater | 45/6 |
| 2,348,414 A | 5/1944 | Pierce | |
| 2,589,803 A * | 3/1952 | Haley | 104/94 |
| 2,691,238 A | 10/1954 | Svatos | |
| 2,713,609 A * | 7/1955 | Niklason | 248/163.1 |
| 2,778,512 A * | 1/1957 | Strona | 212/74 |
| 2,812,067 A | 11/1957 | Gussack | |
| 2,870,459 A | 1/1959 | Zabielski | |
| 2,886,182 A | 5/1959 | Dauman | |
| 2,928,555 A | 3/1960 | Childs et al. | |
| 2,963,332 A | 12/1960 | Breuning | |
| 2,979,155 A * | 4/1961 | Scharfenberger | 182/222 |
| 3,017,999 A | 1/1962 | Cano | |
| 3,042,978 A | 7/1962 | Eames et al. | |
| 3,078,133 A | 2/1963 | Schauer | |
| 3,141,207 A | 7/1964 | Kahler | |
| 3,181,274 A | 5/1965 | Izenour | |
| 3,251,477 A | 5/1966 | Parstorfer | |
| 3,286,382 A | 11/1966 | Newman | |
| 3,351,211 A | 11/1967 | Best | |
| 3,391,796 A | 7/1968 | Cross | |
| 3,412,868 A | 11/1968 | Carter | |
| 3,425,568 A | 2/1969 | Albright | |
| 3,514,883 A | 6/1970 | Albright | |
| 3,557,499 A | 1/1971 | Dickie et al. | |
| 3,683,100 A | 8/1972 | Deal et al. | |
| 3,732,633 A | 5/1973 | Margolis et al. | |
| 3,760,952 A | 9/1973 | White | |
| 3,777,896 A | 12/1973 | Ehrlich | |
| 3,797,146 A | 3/1974 | Holes | |
| 3,883,972 A | 5/1975 | Propst et al. | |
| 3,921,320 A | 11/1975 | McWilliams | |
| 3,924,749 A | 12/1975 | Weston | |
| 3,955,788 A | 5/1976 | Delage | 248/228 |
| 3,975,837 A | 8/1976 | Baars | |
| 3,984,930 A | 10/1976 | Booland | |
| 4,033,058 A | 7/1977 | Lyman | |
| 4,135,775 A | 1/1979 | Driscoll | |
| 4,166,332 A | 9/1979 | Donovan | |
| 4,180,298 A | 12/1979 | Borgerson, Jr. | |
| 4,194,313 A | 3/1980 | Downing | |
| 4,239,170 A | 12/1980 | Planebo | |
| 4,270,290 A | 6/1981 | Eckert | |
| 4,323,291 A | 4/1982 | Ball | |
| 4,360,240 A | 11/1982 | Koncelik et al. | |
| 4,360,991 A | 11/1982 | West | |
| 4,428,136 A | 1/1984 | Franklin | |
| 4,447,973 A | 5/1984 | Wihlke | |
| 4,457,436 A | 7/1984 | Kelley | |
| 4,478,467 A | 10/1984 | Tyndall | |
| 4,561,619 A | 12/1985 | Robillard et al. | |
| 4,569,448 A | 2/1986 | Graham | |
| 4,606,394 A | 8/1986 | Bannister | |
| 4,620,635 A | 11/1986 | Morand | |
| 4,637,666 A | 1/1987 | Worrell et al. | 312/196 |
| 4,658,966 A | 4/1987 | Broek | |
| 4,659,048 A | 4/1987 | Fahrion | 248/285 |
| 4,715,154 A | 12/1987 | Baloga | |
| 4,723,665 A | 2/1988 | Benedict et al. | |
| 4,723,821 A | 2/1988 | Montgomery | |
| 4,732,089 A | 3/1988 | Mueller | 108/102 |
| 4,750,305 A | 6/1988 | Bastian | |
| 4,793,495 A | 12/1988 | Preu | |
| 4,805,331 A | 2/1989 | Boggess et al. | |
| 4,852,500 A | 8/1989 | Ryburg et al. | 108/105 |
| 4,902,229 A | 2/1990 | Pedersen et al. | |
| 4,913,297 A | 4/1990 | Wells | |
| 4,979,785 A | 12/1990 | Richards | |
| 4,986,194 A | 1/1991 | Bollman | 108/111 |
| 5,090,171 A | 2/1992 | Kano et al. | |
| 5,108,063 A * | 4/1992 | Koerber et al. | 248/284.1 |
| 5,109,994 A | 5/1992 | Kidd et al. | |
| 5,112,020 A | 5/1992 | Ginsberg | |
| 5,125,202 A | 6/1992 | Kissinger | |
| 5,139,155 A | 8/1992 | Laxson | |
| 5,160,050 A | 11/1992 | Russo | |
| 5,161,321 A | 11/1992 | Kuhnke | |
| 5,181,334 A | 1/1993 | Mima | |
| 5,214,885 A | 6/1993 | Maas et al. | |
| 5,226,548 A | 7/1993 | Koeppel | |
| 5,241,796 A | 9/1993 | Hellwig et al. | |
| 5,282,341 A | 2/1994 | Baloga et al. | |
| 5,289,926 A | 3/1994 | Lewis et al. | |
| 5,290,002 A | 3/1994 | Cohen | |
| 5,301,477 A | 4/1994 | Rellinger et al. | |
| 5,309,686 A | 5/1994 | Underwood et al. | |
| 5,321,579 A | 6/1994 | Brown et al. | |
| 5,375,802 A | 12/1994 | Branham, II | |
| 5,379,977 A * | 1/1995 | Ronn et al. | 248/277.1 |
| 5,384,999 A | 1/1995 | Roche et al. | |
| 5,392,934 A | 2/1995 | Fox | |
| 5,394,631 A | 3/1995 | Bosio | |
| 5,405,117 A * | 4/1995 | Davis | 248/323 |
| 5,406,761 A | 4/1995 | Hobbiebrunken et al. | |
| 5,422,155 A | 6/1995 | Spence, Jr. | |
| 5,428,928 A | 7/1995 | Hellwig et al. | |
| 5,486,391 A | 1/1996 | Tyner | |
| 5,495,953 A | 3/1996 | Bearth | |
| 5,503,278 A | 4/1996 | Ishmael | |
| 5,511,348 A | 4/1996 | Cornell et al. | |
| 5,513,574 A | 5/1996 | Collins | |
| 5,536,080 A | 7/1996 | Madimenos et al. | |
| 5,537,290 A | 7/1996 | Brown et al. | 361/681 |
| 5,558,418 A | 9/1996 | Lambright et al. | |
| 5,584,546 A | 12/1996 | Gurin et al. | |
| 5,588,659 A | 12/1996 | Boes et al. | |
| 5,590,940 A | 1/1997 | Richard | |
| 5,607,214 A | 3/1997 | Pierce et al. | |
| 5,609,112 A | 3/1997 | Meyer et al. | |
| 5,635,265 A | 6/1997 | Potokar | |
| 5,649,631 A | 7/1997 | Loflin | |
| 5,669,518 A * | 9/1997 | Kundel | 104/94 |
| 5,675,946 A | 10/1997 | Verbeek et al. | |
| 5,687,499 A | 11/1997 | Brnjac | |
| 5,687,513 A | 11/1997 | Baloga et al. | |
| 5,694,881 A | 12/1997 | Creech | |
| 5,695,264 A | 12/1997 | Koch | |
| 5,724,778 A | 3/1998 | Cornell et al. | |
| 5,743,193 A | 4/1998 | Kakuta et al. | |
| 5,746,330 A | 5/1998 | DiBetta | |
| 5,765,315 A | 6/1998 | Nagamitsu et al. | |
| 5,826,385 A | 10/1998 | Dykstra et al. | |
| 5,826,639 A | 10/1998 | Miller | |
| 5,829,202 A | 11/1998 | Canton Gongora et al. | |

| | | |
|---|---|---|
| 5,831,211 A | 11/1998 | Gartung et al. |
| 5,848,698 A | 12/1998 | Stompe |
| 5,873,205 A | 2/1999 | Hanlon et al. |
| 5,901,513 A | 5/1999 | Mollenkopf et al. |
| 5,904,328 A | 5/1999 | Leveridge et al. |
| 5,931,429 A | 8/1999 | Hellwig et al. |
| 5,941,713 A | 8/1999 | Wayner et al. |
| 5,952,796 A * | 9/1999 | Colgate et al. ............... 318/1 |
| 5,966,879 A | 10/1999 | Verbeek et al. |
| 5,984,441 A | 11/1999 | Stokhuijzen |
| 6,048,044 A | 4/2000 | Biggel et al. |
| 6,076,317 A | 6/2000 | Hellwig et al. |
| 6,099,093 A | 8/2000 | Spence |
| 6,244,991 B1 * | 6/2001 | Bingham ................... 482/69 |
| 6,249,999 B1 | 6/2001 | Börge et al. |
| 6,275,375 B1 | 8/2001 | Nam |
| 6,317,316 B1 | 11/2001 | Bentley et al. |
| 6,343,006 B1 | 1/2002 | Moscovitch et al. |
| 6,409,134 B1 | 6/2002 | Oddsen, Jr. |

OTHER PUBLICATIONS

U.S. patent application titled Movable Display Support System, U.S. application No. 09/887,519 filed on Jun. 22, 2001; 22 pages, Figures 1–6 listing inventors Mark A. Baloga, Carl V. Forslund III and Thomas G. Feldpausch.

M.A. Baloga, C.V. Forslund III, et al., Compilation titled "Bluespace" dated Aug. 29, 2000 (internal document proprietary to Steelcase Inc.).

Brochure by UNIFOR titled "Panelli PL" (undated) (37 sheets).

Brochure by UNIFOR titled "Progetto 25.90" (undated) (19 sheets).

Promotional material (chart) by Dowing Displays of Milford, Ohio, showing models (no date), (8 color sheets).

Promotional material for "The Office of the Future", by Tarrant Interiors—of Fort Worth, Texas, (no date), (4 sheets).

Innamorati, Francesco, "The Telematic Tree", Habitat Ufficio, bearing a designation 1991 (5 sheets).

Advertisement for "Ameriwood Oak Armoire", by Office Max, bearing a designation "Nov. 11, 1995", (1 sheet).

Gertsakis, John, "Durable Yet Future Proof", bearing a designation "© 1996, National Key Centre for Design at RMIT", from Internet site: www.cfd.rmit.edu.au/outcomes/erdnews/ERD6/HOTdesk.html on Oct. 27, 1998 (3 sheets).

Promotional materials for "A World of Possibilities, Introducing Contrada™. The Next Generation in Office Furniture.", by Trendway Corporation of Holland, Michigan, bearing a designation "© 1998" (8 sheets).

Promotional material for "Village Wall," By Tellus Furniture a Paoli Company of Orleans, Indiana, bearing a designation "©1998 Tellus Furniture", (8 color sheets).

Yates, JoAnne, "Graphic ROI Reporting," Knowledge Management at 106, (Oct. 1998) (2 sheets).

Brochure for "TooGo New Workplace Solutions", by Egan Visual, bearing a designation "©Copyright Egan Visual 1999", (16 color sheets).

Catalog pages for "Details" a Steelcase Company, with a 3/01 indication, "© 2001 Office Details Inc." (6 color sheets).

U.S. patent application Ser. No. 09/182,998, titled "Information Display System" as filed on Oct. 30, 1998, including specification, claims, drawings and abstract (104 sheets).

U.S. patent application Ser. No. 09/183,023, titled "Workstation" as filed on Oct. 30, 1998, including specification, claims, drawings and abstract (106 sheets).

U.S. patent application Ser. No. 09/183,021, titled "Work Environment" as filed on Oct. 30, 1998, including specification, claims, drawings and abstract (101 sheets).

U.S. patent application Ser. No. 09/260,474, titled "Information Display System" as filed on Mar. 1, 1999, including specification, claims, drawings and abstract (35 sheets).

U.S. patent application Ser. No. 09/645,023, titled "Workstation" as filed on Aug. 23, 2000, including specification, claims, drawings and abstract (106 sheets). Preliminary Amendment filed Aug. 23, 2000 (40 sheets).

U.S. patent application Ser. No. 09/571,521, titled "Information Display System" as filed on May 16, 2000, including specification, claims, drawings and abstract (103 sheets). Preliminary Amendment filed May 16, 2000 (19 sheets).

U.S. patent application Ser. No. 09/650,210, titled "Work Environment" as filed on Aug. 29, 2000, including specification, claims, drawings and abstract (101 sheets). Preliminary Amendment filed Aug. 29, 2000 (32 sheets).

U.S. patent application Ser. No. 09/669,913, titled "Display Board System" as filed on Sep. 25, 2000, including specification, claims, drawings and abstract (66 sheets). Preliminary Amendment filed Sep. 25, 2000 (36 sheets).

U.S. patent application Ser. No. 09/563,098, titled "Display Board System" as filed on May 2, 2000, including specification, claims, drawings and abstract (113 sheets).

U.S. patent application Ser. No. 09/182,999, titled "Display Board System" as filed on Oct. 30, 1998, including specification, claims, drawings and abstract (63 sheets).

U.S. patent application Ser. No. 09/182,997, titled "Display Board System" as filed on Oct. 30, 1998, including specification, claims, drawings and abstract (64 sheets).

* cited by examiner

MOVABLE OFFICE SUPPORT SYSTEM

CROSS-REFERENCE TO RELATED APPLICATIONS

The following patents and/or patent applications are hereby incorporated by reference: U.S. patent application Ser. No. 09/887,519 titled "MOVABLE SUPPORT SYSTEM" filed Jun. 22, 2001; U.S. patent application Ser. No. 09/183,023 titled "WORKSTATION" filed Oct. 30, 1998, now U.S. Pat. No. 6,374,547 issued on Apr. 23, 2002.

FIELD OF THE INVENTION

The present invention relates to a movable display support system. The present invention also relates to a support system for a display device or the like which is movable within a work space to support one or more workers in a wide variety of use conditions.

BACKGROUND

It is known to provide for a display device such as a display panel, video monitor (e.g. CRT), television screen or other video display to present information (in some form) for entertainment or use by one or more workers in an office or other work environment. Display devices are generally associated with electronic equipment or appliances, such as computing devices or video receivers (e.g. television or the like).

In a typical application, the display device is positioned on a fixed worksurface (such as a table or desk), and thereby is in a relatively fixed or "static" position relative to workers or other persons who enter a work space (such as an office). Where the display device is a conventional video monitor, it may be difficult (if not also inconvenient) to adapt the position of the display device to the needs of one or more workers who may have the need or desire to view or share information presented. Likewise, it can be difficult to move the display device to a less prominent position within the work space, for example when information is to be viewed in private, or when the display device is not in use. In any event, according to known arrangements, it is typically difficult as well as inconvenient to move a display device from an in-use position where information can be viewed and shared readily to a private or stowed position where information is not displayed or not to be shared by persons in the work space. As a result, in many applications, display devices, once installed in a work space, are not repositioned frequently—even if repositioning would be desirable or advisable under the circumstances.

The more prevalent use of display panels (e.g. flat panel displays) as display devices for computing devices has to some extent lessened the inconvenience of repositioning, but the basic difficulties remain. Moreover, the need to provide a connection for utilities (e.g. power and/or data) to the display device is also a consideration. In typical applications, such connections are made by cables and require suitable proximity to outlets, and cause additional difficulty to be addressed when the display device is to be repositioned within the work space.

Fixture arrangements for display devices, such as adjustable arms, bases or stands, are known. However, such arrangements are typically positioned in a fixed location within the work space and thereby allow for a limited range of motion or change in orientation of the display device. Moreover, it is typical for such arrangements to accommodate only a single display device. When two (or more) display devices are used, the difficulties of positioning and repositioning may be multiplied.

Accordingly, it would be advantageous to provide a support system for a display device that allows for convenient repositioning of the display device within a work space. It would also be advantageous to provide a support system for a display device that provides for a wide range of motion and allows for a variety of orientations of the display device. It would further be advantageous to provide for a support system for a display device that can accommodate one or two or more display devices. It would further be advantageous to provide for a support system that provides for convenient management and interconnection of cables providing utilities to the display device (or display devices). It would further be advantageous to provide for a support system for a display device that can readily be integrated with the articles of furniture within a work space. It would further be advantageous to provide for a support system for a display device that can provide an interface for known fixture arrangements used for display devices.

It would be desirable to provide a system and method having any one or more of these or other advantageous features.

SUMMARY OF THE INVENTION

The present invention relates to a movable support system for at least one display device. The system includes a track system and a base movably mounted at a first section to the track system. The system also includes a display support assembly adapted for coupling of the display device and pivotally mounted at a second section of the base. The display device installed on the display support assembly may be selectively positioned for use in a variety of locations relative to the track system.

The present invention also relates to an apparatus providing a movable support for a display device. The system includes a track system providing at least one track and a support movably coupled at a first section to the track system. The system also includes a display support movably coupled to a second section of the support and configured for coupling of at least two display panels. Each of the display panels may be positioned for use in a variety of locations relative to the track.

The present invention further relates to a movable support system for at least one display device configured to be coupled to utilities such as power or data through cables. The system includes a track and a support movably mounted at a first section to the track. The system also includes a display support adapted for coupling of a display device and pivotally mounted at a second section of the support. The display device installed on the display support may be selectively positioned for use in a variety of locations relative to the track, wherein the support is configured to provide at least one passage for management of cables configured to be coupled to the display device.

The present invention also relates to a movable support system for use by at least one person in a work space having an entrance. The system includes a track system and a base movably mounted at a first section to the track system. The system also includes a display support assembly adapted for coupling of at least one display device and pivotally mounted at a second section of the base. A display device installed on the display support assembly may be selectively positioned for use in a variety of locations relative to the track system so that each person within the work space may selectively choose a body orientation or a body position

FIGURES

DETAILED DESCRIPTION OF EXEMPLARY EMBODIMENTS

Figure 1:
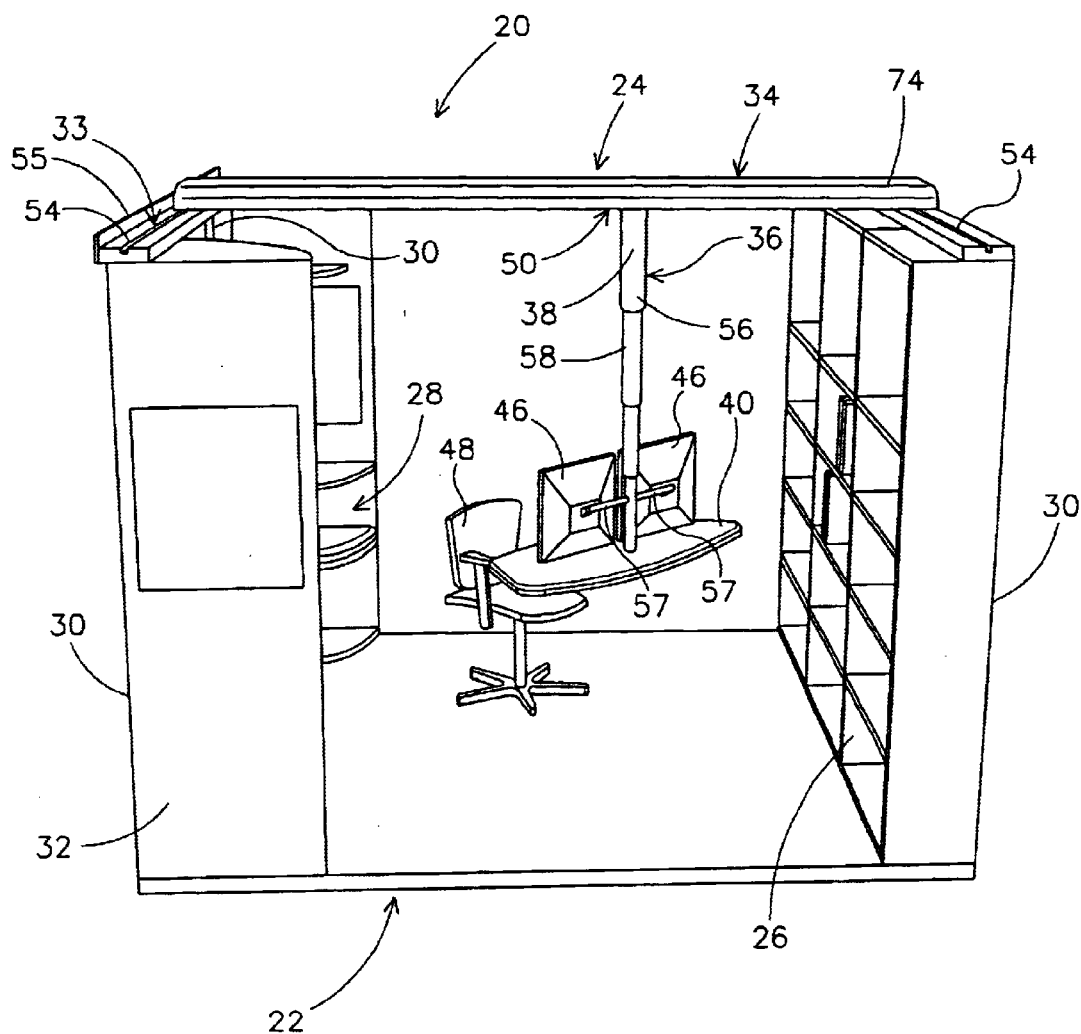
FIG. 1 is a perspective view of work space providing a display support system according to an exemplary embodiment.

Referring to FIG. 1, a work space 10 is shown including a workstation 12 configurable for use by one or a plurality of workers or other persons. Workstation 12 includes a movable display support system 14 along with other articles of furniture shown as an associated mobile worksurface or table 16, a fixed worksurface 18, storage units shown as shelving units 20 and lateral files 22. Work space 10 also provides walls shown as partial height partition walls including a base wall 24 and side walls 26 as well as a utility threshold 28 movable on a track 30 (not visible in FIG. 1). According to any preferred embodiment, the utility threshold is of a type disclosed in U.S. patent application Ser. No. 09/183,023, titled "Workstation" and filed on Oct. 30, 1998, and in U.S. patent application Ser. No. 09/183,021, titled "Work Environment" and also filed on Oct. 30, 1998 (both incorporated by reference herein), providing functionality and features such as power, voice and data connections, display devices or information display panels, lighting, privacy screens, etc. Also shown in work space 10 are chairs 32 (which can be of any conventional type, preferably mobile chairs). As shown, movable display support system 14 includes two display devices shown as display panels 34.

Figure 2:
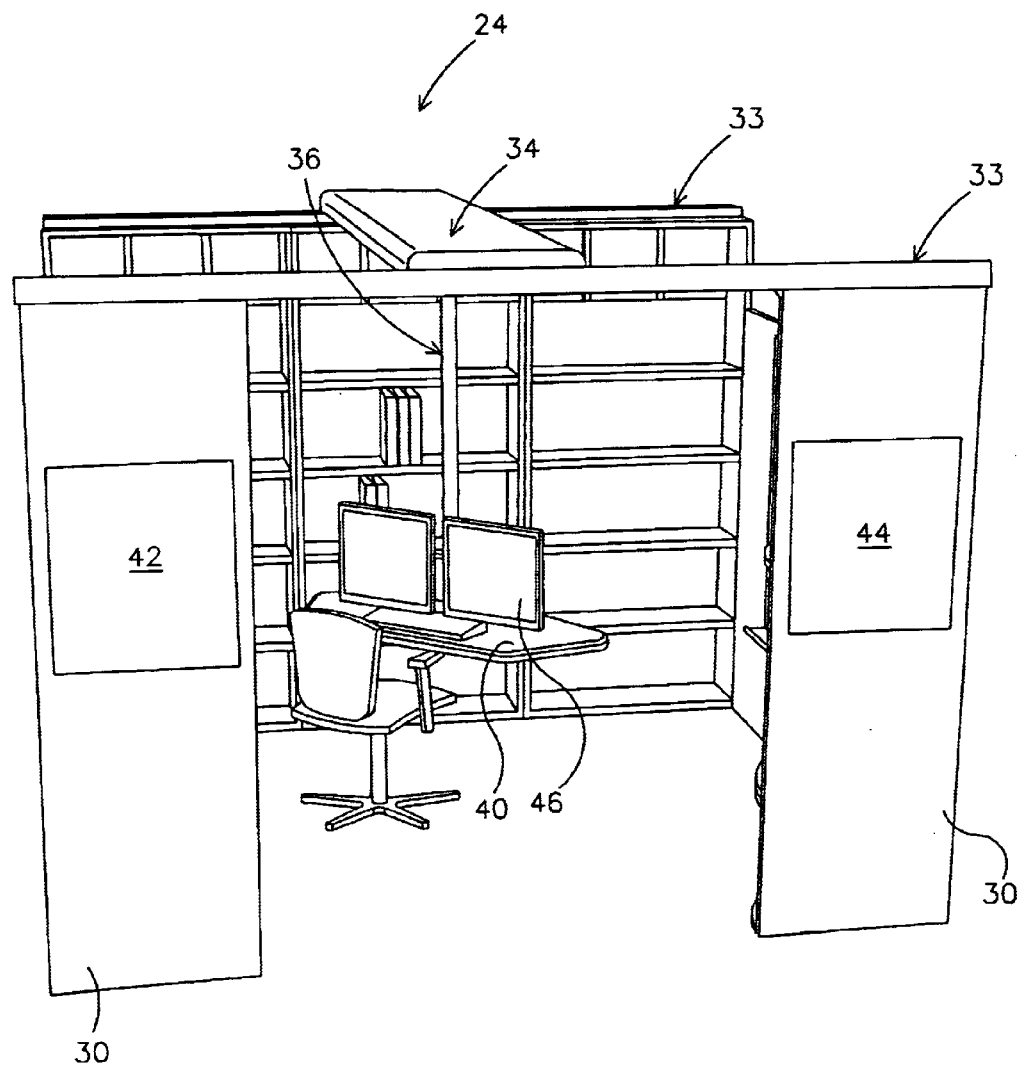
FIG. 2 is a front perspective view of the display support system according to an exemplary embodiment.
Figure 3:
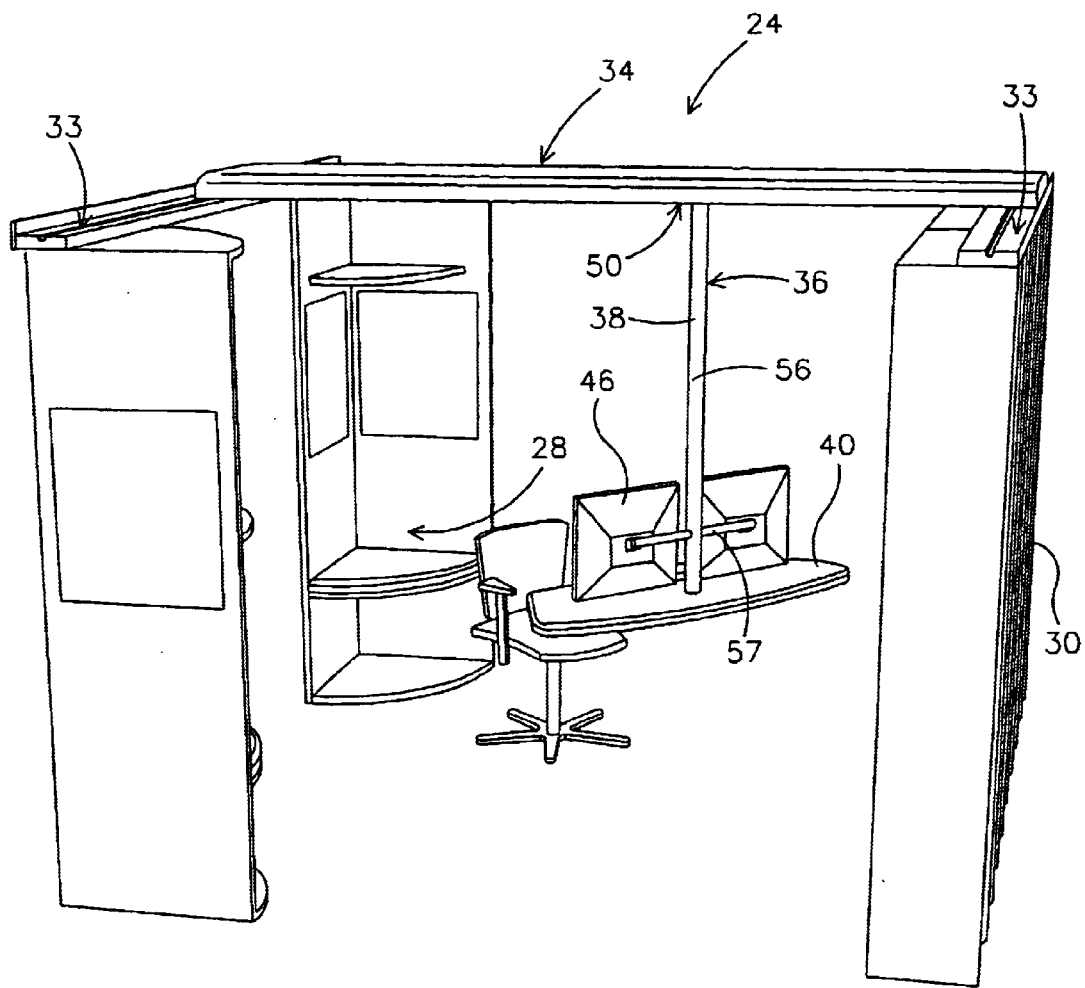
FIGS. 3A and 3B are top perspective views of the support system.

Referring to FIG. 2, movable display support system 14 is shown. Support system 14 includes a base 36 mounted to a track system 38 for translating movement (e.g. linear or curved or other) along a path of travel. Track system 38 is installed upon a mounting structure shown as a panel 40 (shown in FIG. 3). A passage in panel 40 shown as groove 41 can be used for routing various cables to base 36. Support system 14 also includes a display support assembly 42 movably coupled to the base 36. Support assembly 42 includes flanges 44 configured for attachment of a fixture or structure shown as an articulable arm 46 used to support an information display device shown as a display panel 34 (or any other structure such as a base or fixture of any conventional type providing one or more points or "joints" for movement of a mounted display device). According to an exemplary embodiment, support assembly 42 is pivotably coupled to base 36 and each articulable arm 46 is movably coupled to flange 44 to allow suitably positioning and/or orientation of display panel 34 in any of a variety of directions (e.g., up, down, laterally, pivotably) at each point or joint allowing articulation (e.g. translation, extension, retraction, rotation, etc.). As shown in FIGS. 3A and 3B, the selective movement of base 36 with respect to the mounting structure shown as panel 40 (e.g. along track system 38) and/or of support assembly 42 with respect to base 36 provides for the positioning and orientation of one or more of display panels 34 within a substantial range of motion in work space 10; selective movement of display panel 34 with respect to support assembly 42 provides for additional range of motion within work space 10.

According to an exemplary embodiment shown in FIGS. 4A and 4B, panel 40 for track system 38 is installed horizontally between two storage units 48; a worksurface 50 may be installed within work space 10 over track system 38. According to any preferred embodiment, the system may be integrated with or within articles of furniture in the work space.

Figure 5:
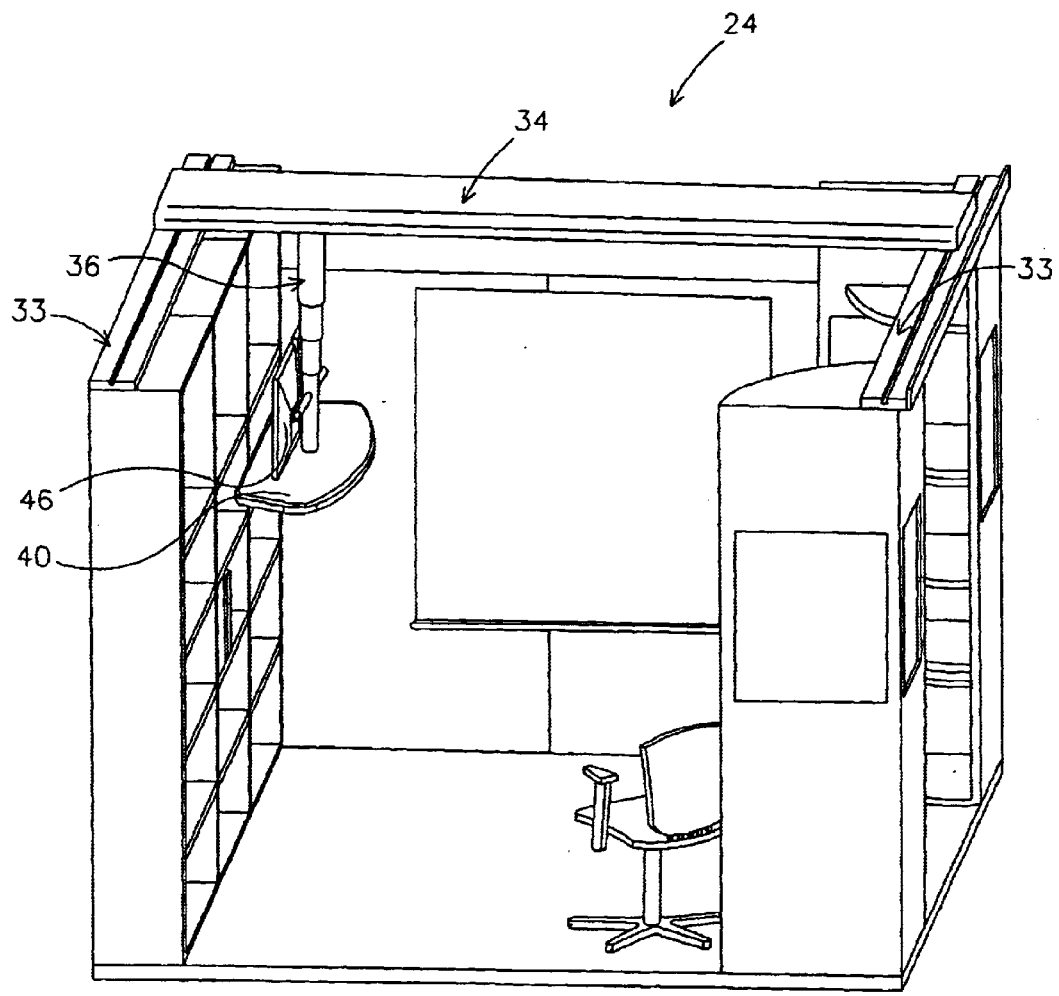
FIG. 5 is a top perspective view of the support system.
Figure 6:
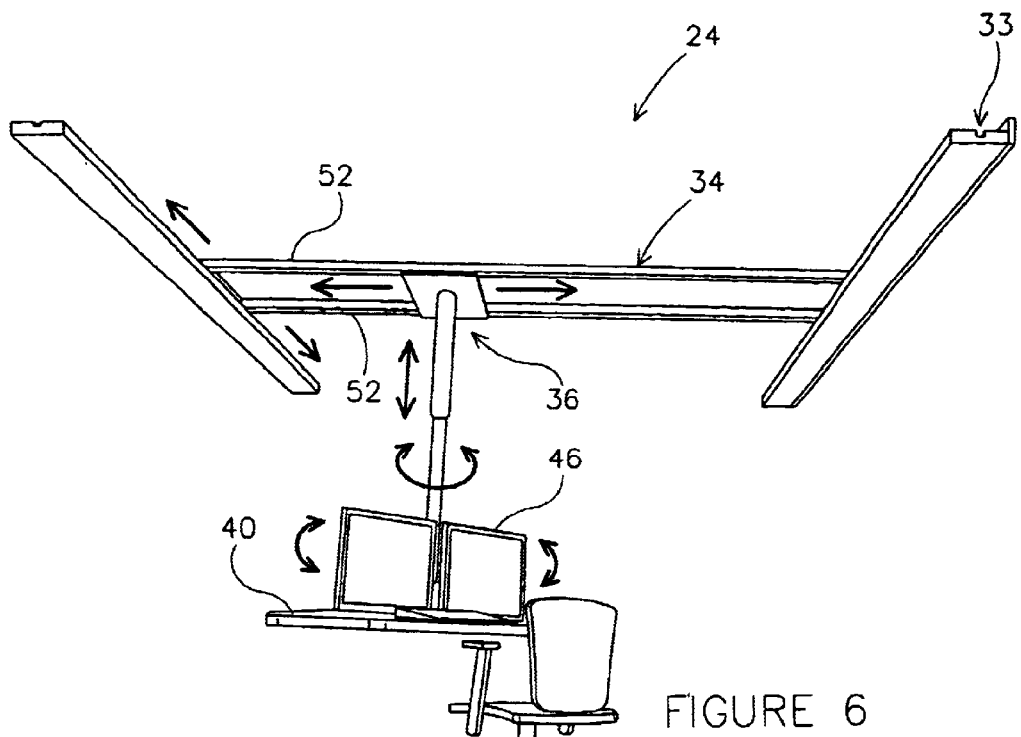
FIG. 6 is a bottom perspective view of the support system display.

Referring to FIGS. 5 and 6, movable display support system 14 is shown in a reverse view so that the underside of base 36 is visible. Base 36 includes a set of passages 52 and an aperture 54 for routing of cables 56 (for utilities such as power, communication and/or data, which may be routed to base 36 through passage or groove 41 of panel 40) to each of display panels 34. Base 36 also includes a hub 58 providing paths or slots 60 for maintaining or retaining cables 56 below the coupling of display support assembly 42. As shown in FIG. 5, track system 38 includes a set of tracks or rails 62 providing for guided and bounded motion of base 36. As shown in FIG. 6, a set of roller guides 64 on base 36 engage rails 62 of track system 38. According to a particularly preferred embodiment, hub 58 is rotatable within base 36 and display support assembly 42 is mounted to hub 58 to allow for rotation of display panels 34. Display support assembly 42 may provide a worksurface 66 as well as a handle 68 (both shown in FIG. 2) to facilitate movement of the display devices.

According to any preferred embodiment, the system will provide for a wide range of motion for one or more display devices, including one or more of the following arrangements or combinations of arrangements for positioning and repositioning: (a) translating movement of the base along the track system, e.g. from one part of the work space to another for open use or stowing (see FIGS. 3A and 3B); (b) rotation of the display support assembly within a range of motion, e.g. to allow open viewing or privacy or stowing of the display device (see FIGS. 2 and 3A and 3B); (c) articulation of the structure or arm, e.g. further to optimize the viewing angle/position (such as to remove glare or enhance visibility) of the display screen or further to enhance sharing/revealing or privacy/concealment of information. According to any preferred embodiment, the wide range of motion provided by the system will enhance the ability of workers or other persons to work. collaboratively or to maintain privacy with information or to open or stow the display device (or display devices) conveniently—relatively quickly and easily—and without requiring significant concern for management of cables.

According to alternative embodiments, the movable display support system may be configured for one information display device or two or more information display devices;

the information display devices may be of any type, including flat display panels or other types of video monitors (e.g. CRT) or any other type of data or information display device or appliance. The information display device may be associated with any type of appliance or device, such as a computing device or a television or network, etc.

In a conventional arrangement for associating a display device within a work space, where the display device is positioned on a fixed worksurface, constraints are typically imposed upon the orientation of a user or users relative to the entrance of the work space or adjacent aisles or opportunities for potential shared zones for viewing the display device with others. For example, if the display device is positioned on a worksurface to the back (or in one side or back corner) of the work space, the user of the work space may be constrained to work with her or his back to the entrance of the work space and information on the display device may be visible to those who enter the work space or walk along the adjacent aisle; if the display device is positioned on a worksurface near the center or front of the work space, the user of the work space may be constrained to "work around" the display device and may be less able to share information on the display device with those who enter the work space.

According to any preferred embodiment, the support system will provide enhanced functionality in comparison with such conventional arrangements, and allow the display device (or display devices) to be positioned selectively to enhance privacy or openness, or generally to facilitate the work to be performed in the work space; the support system is intended to allow the repositioning (including physical placement and orientation) of the display device to suit the needs of the worker. That is, according to any preferred embodiment of the support system, the user or users (without having to adapt or adjust their own posture and/or position) will be able to adapt the positioning and orientation of the display device or devices for various use conditions.

According to other exemplary embodiments, the display devices may be associated with other articles of furniture and/or physical structures (such as panels, partitions, or walls). It is important to note that the term "article of furniture" is intended to be a broad term and not a term of limitation. The term "article of furniture," as used in this disclosure, may include, without limitation: systems furniture (e.g., partition wall systems, architectural walls, space frames, work stations, etc.), casegoods (e.g., file cabinets, storage bins, containers, closets, etc.), seating products (e.g., chairs, stools, lounges, etc.), work surfaces (e.g., tables, desk systems, credenzas, etc.), lighting systems, and other accessories.

It is important to note that the term "information" is intended to be a broad term and not a term of limitation. The term "information" may include information of any type or form or combination. It is also important to note that the terms "worksurface" and "work space" are intended to be given broad scope and are not terms of limitation. It is also important to note that the construction and arrangement of the elements of the system as shown in the preferred and other exemplary embodiments is illustrative only.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A movable support system for use in a work space such as an office, comprising:
   a track system above at least a portion of the office;
   a support movably coupled to the track system and configured to project downward into the office;
   a worksurface coupled to the support;
   wherein the worksurface may be brought into use in multiple locations about the office; and
   wherein the track system is supported at least in part by an article of furniture selected from the group consisting of a bookcase, a storage unit, a shelving unit, a file cabinet, and a credenza.

2. The system of claim 1 further comprising at least one display device coupled to the support.

3. The system of claim 1 further comprising at least one worksurface and at least one display device.

4. The system of claim 1 further comprising a rail system movably coupled to the track system and wherein the support is movably coupled to the track system through the rail system.

5. The system of claim 1 wherein the support is configured for vertical position adjustment of the worksurface.

6. The system of claim 5 wherein the support provides for telescopic height adjustment for the worksurface.

7. The system of claim 1 wherein the track system includes two overhead tracks.

8. The system of claim 7 wherein track system is linear.

9. The system of claim 7 wherein the track system is permanently mounted to a structure within the office.

10. The system of claim 7 wherein the track system is mounted on opposed walls of the office.

11. The system of claim 1 wherein the track system allows for placement of the support in a stowed position.

12. The system of claim 1 wherein the track system is elevated.

13. The system of claim 1 wherein the support is configured for management of cables providing utilities such as power or voice or data to the worksurface.

14. The system of claim 1 further comprising two display devices coupled to the support.

15. The system of claim 1 wherein at least one display device is directly coupled to the support.

16. The system of claim 4 wherein the rail system includes a cover.

17. The system of claim 1 wherein the worksurface is not supported on a floor of the office.

18. The system of claim 4 wherein the rail system is linear.

19. The system of claim 4 wherein the rail system provides a pair of rails and the support includes a base installed between the pair of rails.

20. The system of claim 5 wherein the support includes a vertical post to which the worksurface is coupled.

21. The system of claim 20 wherein the vertical post includes a first section and a second section and wherein the second section fits within the first section in a telescoping arrangement to allow for vertical position adjustment of the worksurface.

22. The system of claim 1 further comprising a pair of supports so that each support provides a worksurface.

23. The system of claim 4 wherein the track system is transverse to the rail system so that the support can be moved within a predetermined range of motion.

24. The system of claim 23 wherein the predetermined range of motion comprises at least half of the office.

25. The system of claim 17 wherein the worksurface can be stowed by movement to a predetermined position within the work space.

26. The system of claim 1 wherein the worksurface is pivotally coupled to the support.

27. The system of claim 1 wherein the worksurface can be moved in a horizontal direction and in a vertical direction within a predetermined range of motion.

28. The system of claim 1 further comprising an outlet adapted for interconnection of utilities such as power or data to an appliance associated with the worksurface.

29. The movable support system of claim 1 wherein the worksurface is fixed substantially parallel to a floor of the work space.

30. A movable support system for an office of a type having a floor, comprising:
    an overhead track system configured to project over at least a portion of the office;
    a support slidably suspended from the overhead track system and configured to hang downward into the office;
    at least one display device coupled to the support;
    a worksurface attached to the support;
    wherein the overhead track system is supported at least in part by an article of furniture selected from the group consisting of a bookcase, a storage unit, a shelving unit, a file cabinet, and a credenza; and
    wherein the worksurface may be brought into use in multiple locations about the office.

31. The movable support system of claim 30 wherein the worksurface can be stowed by movement to a predetermined position within the office.

32. The movable support system of claim 30 wherein the worksurface can be stowed within a storage unit.

33. The movable support system of claim 30 wherein the worksurface is fixed substantially parallel to the floor.

34. The system of claim 30 further comprising a rail system movably coupled to the track system and wherein the support is movably coupled to the track system through the rail system.

35. The system of claim 30 wherein the support is configured for vertical position adjustment of the display device.

36. The system of claim 30 wherein the track system includes two overhead tracks.

37. The system of claim 36 wherein track system is linear.

38. The system of claim 36 wherein the track system is permanently mounted to a structure within the office.

39. The system of claim 35 wherein the support is configured for management of cables providing utilities such as power or voice or data to the worksurface.

40. The system of claim 30 further comprising two display devices coupled to the support.

41. The system of claim 30 further comprising a rail system providing a pair of rails and wherein the support includes an interface installed between the pair of rails.

42. The system of claim 35 wherein the support includes a vertical post to which the worksurface is coupled.

43. The system of claim 42 wherein the vertical post includes a first section and a second section and wherein the second section fits within the first section in a telescoping arrangement to allow for vertical position adjustment of the worksurface.

44. The system of claim 30 further comprising a pair of supports so that each support provides a worksurface.

45. The system of claim 30 wherein the worksurface is pivotally coupled to the support.

46. The system of claim 45 wherein the worksurface can be moved both in a horizontal direction and in a vertical direction within a predetermined range of motion.

47. A movable support system for a work space such as an office, comprising:
    a first elevated system that includes a track system configured to project over at least a portion of the office;
    a second elevated system cooperating with the first system and configured to project over at least a portion of the office;
    a support assembly movable relative to the first system and configured to project downward into the office;
    a worksurface coupled to the support assembly;
    wherein the track system is supported at least in part by an article of furniture selected from the group consisting of a bookcase, a storage unit, a shelving unit, a file cabinet, and a credenza; and
    wherein the worksurface may be brought into use in multiple locations within the work space.

48. The system of claim 47 wherein the second elevated system is a rail system.

49. The system of claim 47 wherein the first system and second system are movably coupled in an orthogonal arrangement and the support includes a coupling member movably coupled to the rail system.

50. The system of claim 47 further comprising at least one display device coupled to the support.

51. The system of claim 47 further comprising a rail system movably coupled to the track system and wherein the support is movably coupled to the track system through the rail system.

52. The system of claim 47 wherein the support assembly is configured for vertical position adjustment of the worksurface.

53. The system of claim 52 wherein the support assembly provides for telescopic height adjustment for the worksurface.

54. The system of claim 47 wherein the track system includes two overhead tracks.

55. The system of claim 54 wherein track system is linear.

56. The system of claim 54 wherein the track system is permanently mounted to a structure within the office.

57. The system of claim 54 wherein the track system is mounted on opposed walls of the office.

58. The system of claim 47 wherein the track system allows for placement of the support in stowed position.

59. The system of claim 47 wherein the support assembly is configured for management of cables providing utilities such as power or voice or data to the worksurface.

60. The system of claim 47 further comprising two display devices coupled to the support assembly.

61. The system of claim 50 wherein at least one display device is directly coupled to the support assembly.

62. The system of claim 51 wherein the rail system includes a cover.

63. The system of claim 47 wherein the worksurface is not supported on a floor of the office.

64. The system of claim 47 wherein the rail system is linear.

65. The system of claim 51 wherein the rail system provides a pair of rails and the support assembly includes a base installed between the pair of rails.

66. The system of claim 52 wherein the support assembly includes a vertical post to which the worksurface is coupled.

67. The system of claim 66 wherein the vertical post includes a first section and a second section and wherein the second section fits within the first section in a telescoping arrangement to allow for vertical position adjustment of the worksurface.

68. The system of claim 47 further comprising a pair of support assemblies so that each support assembly provides a worksurface.

69. The system of claim 54 wherein the track system is transverse to the rail system so that the support can be moved within a predetermined range of motion.

70. The system of claim 47 wherein the predetermined range of motion comprises at least half of the office.

71. The system of claim 58 wherein the worksurface can be stowed by movement to a predetermined position within the work space.

72. The system of claim 47 wherein the worksurface is pivotally coupled to the support.

73. The system of claim 47 wherein the worksurface can be moved in a horizontal direction and in a vertical direction within a predetermined range of motion.

74. The movable support system of claim 47 wherein the worksurface is fixed substantially parallel to a floor of the work space.

* * * * *

UNITED STATES PATENT AND TRADEMARK OFFICE
CERTIFICATE OF CORRECTION

PATENT NO.     : 6,739,096 B2
DATED          : May 25, 2004
INVENTOR(S)    : Thomas G. Felpausch, Carl V. Forslund III and Mark A. Baloga It is certified that error appears in the above-identified patent and that said Letters Patent is hereby corrected as shown below:

<u>Title page,</u>
Item [57], ABSTRACT, replace with the attached:

<u>Column 1, line 5 through Column 6, line 14,</u>
The entire specification should be replaced with the attached:

Signed and Sealed this

Twenty-eighth Day of September, 2004

JON W. DUDAS
*Director of the United States Patent and Trademark Office*

ABSTRACT OF THE DISCLOSURE

A movable support system for at least one display device is disclosed having a track system and a base movably mounted at a first section to the track system. A display support assembly adapted for coupling of the display device is pivotally mounted at a second section of the base. The display device installed on the display support assembly may be selectively positioned for use in a variety of locations relative to the track system. An apparatus is also disclosed providing a movable support for a display device, including a track system providing at least one track and a support movably coupled at a first section to the track system. The apparatus also includes a display support movably coupled to a second section of the support and configured for coupling at least two display panels. Each of the display panels may be positioned for use in a variety of locations relative to the track.

BACKGROUND

[0003] It is well-known to provide for a worksurface in a work space such as an office. In a typical application, a work space may have one or more worksurfaces that are installed in a "fixed" position, such as a table or desk or countertop. In such applications, such worksurfaces are installed in positions that are believed to be appropriate for most use conditions. However, it is not uncommon for a work space to be used by one or more workers or other persons in a wide variety of conditions, some of which find the "fixed" position of such worksurfaces to be beneficial, others which find the position acceptable, and others which may find the position tolerable (if not unacceptable).

[0004] It is also known to provide for a mobile worksurface, such as a mobile table, in a work space. In a common application, the mobile worksurface (alone or in conjunction with fixed worksurfaces), enhances the utility of a work space by providing greater flexibility and a greater range of use and other conditions. However, mobile worksurfaces – whether in use or not in use – typically require at least a portion of space within the work space, and at times may prove to be obstacles to occupants of the work space. The range of motion typically provided by such mobile worksurfaces is limited, for example to a particular plane or path of travel. In addition, mobile worksurfaces, typically provided with wheels or otherwise coupled to a fixed mounting structure, tend to lack the stability, size or "structure" typically provided with fixed worksurfaces. Moreover, mobile worksurfaces tend not to readily accommodate computing devices and/or display devices or other appliances and their associated cables (e.g. for power and/or data).

[0005] Accordingly, it would be advantageous to provide for a support system for a worksurface in a work space such as an office that is conveniently movable from one position to another position. It would also be advantageous to provide for a support system for a worksurface that provides a range of movement for the worksurface that covers a substantial portion of the work space. It would also be advantageous to provide for a support system for a worksurface that allows for movement within a horizontal plane and/or to various vertical positions within the work space. It would also be advantageous to provide for a support system for a worksurface that conveniently allows for association with a display device and thereby for convenient repositioning of the display device within a work space. It would also be advantageous to provide a support system for a work surface that provides for a wide range of motion and allows for a variety of orientations. It would further be advantageous to provide for a support system for a display device that can accommodate one or two or more display devices. It would further be advantageous to provide for a support system that provides for convenient management and interconnection of cables providing utilities to the appliances or equipment on a work surface or to a display device (or display devices). It would further be advantageous to provide for a support system that can readily be integrated with the articles of furniture within a work space.

[0006] It would be desirable to provide a system having any one or more of these or other advantageous features.

SUMMARY OF THE INVENTION

[0007] The present invention relates to a movable support system for use in a work space such as an office. The system includes a track system above at least a portion of the office and a support movably coupled to the track system and configured to project downward into the office and a worksurface coupled to the support. The worksurface may be brought into use in multiple locations about the office.

[0008] The present invention also relates to a movable support system for an office. The system includes an overhead track system configured to project over at least a portion of the office, a support slidingly suspended from the overhead track system and configured to hang downward into the office, and at least one display device coupled to the support. The work surface may be brought into use in multiple locations about the office.

[0009] The present invention further relates to a movable support system for a work space such as an office. The system includes a first elevated system configured to project over at least a portion of the office, a second elevated system cooperating with the first system and configured to project over at least a portion of the office. The system also includes a support assembly providing a support movable relative to the first system and configured to project downward into the office, a worksurface coupled to the support. The worksurface may be brought into use in multiple locations within the work space.

FIGURES

[0010] FIGURE 1 is a perspective view of a support system in a work environment according to an exemplary embodiment.

[0011] FIGURE 2 is a perspective view of a support system in a work environment according to an exemplary embodiment.

[0012] FIGURE 3 is a perspective view of a support system in a work environment according to an exemplary embodiment.

Figure 4:
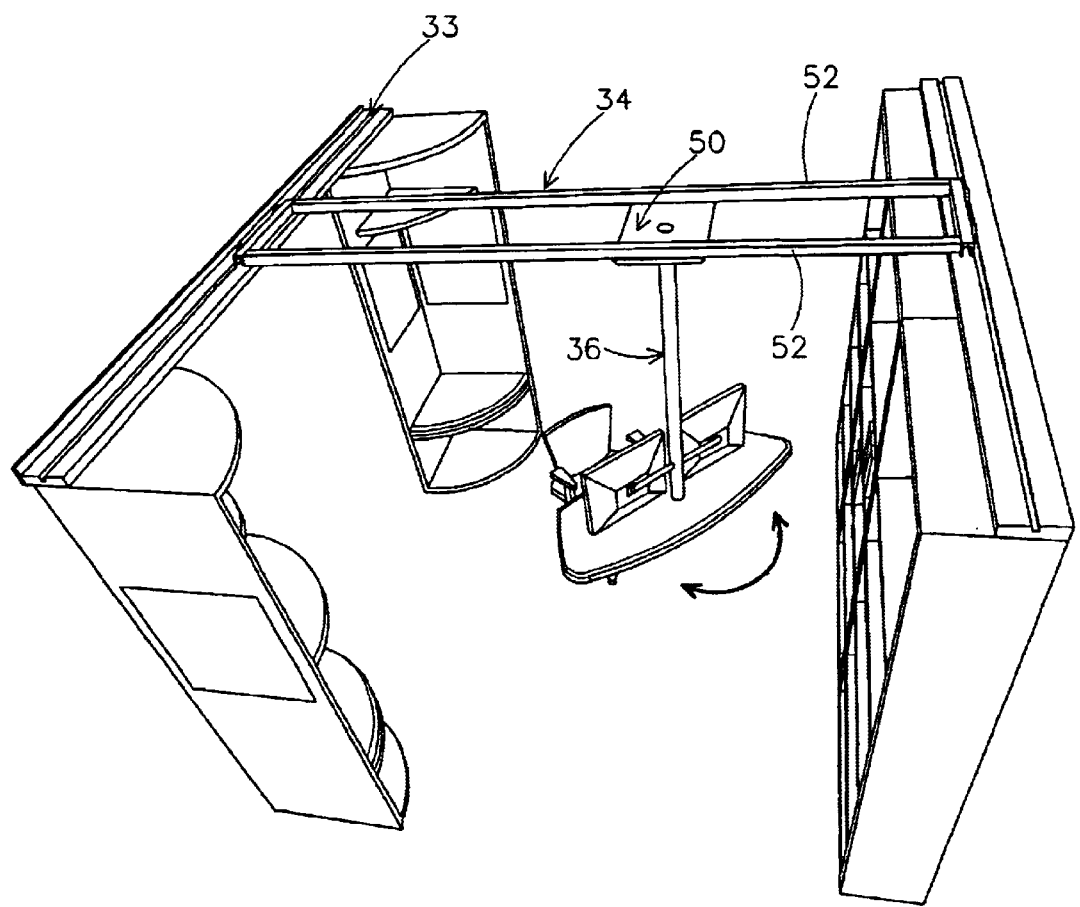
FIGS. 4A and 4B are top perspective views of the display support system within in a work station providing an article of furniture according to an exemplary embodiment.

[0013] FIGURE 4 is a perspective view of a support system in a work environment according to an exemplary embodiment.

[0014] FIGURE 5 is a perspective view of a support system in a work environment according to an exemplary embodiment.

[0015] FIGURE 6 is a bottom perspective view of the system.

Figure 7:
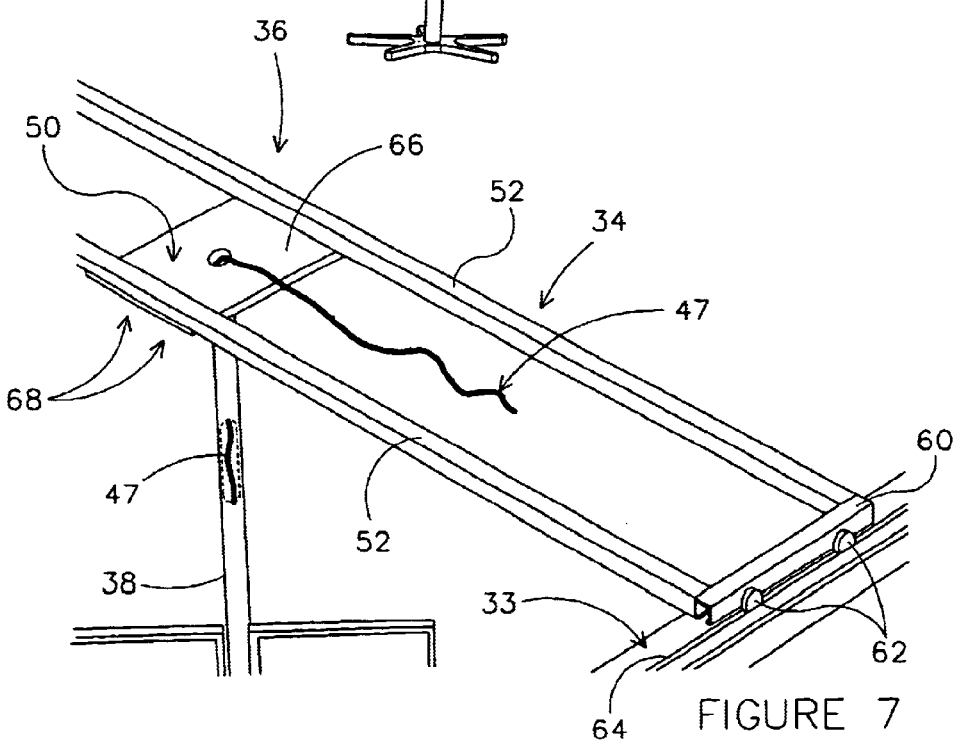
FIG. 7 is a top fragmentary perspective view of the system.

[0016] FIGURE 7 is a top fragmentary perspective view of the system.

Figure 8A:
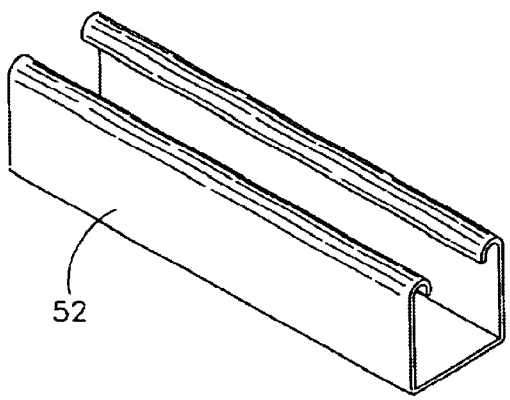
FIG. 8A through 8C are perspective views of elements of the track assembly of the system according to a particularly preferred embodiment.
Figure 8A:
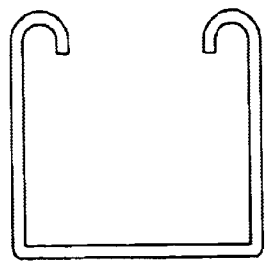
Figure 8B:
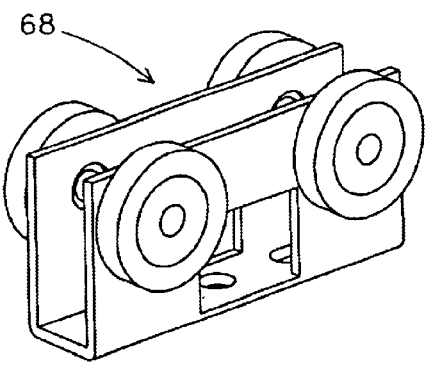
Figure 8B:
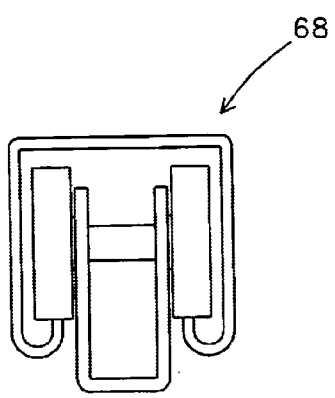
Figure 8C:
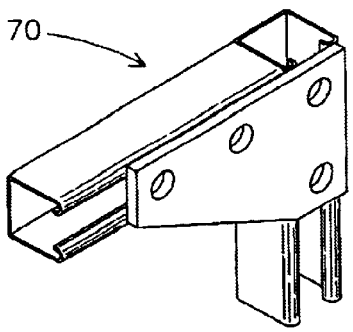
Figure 8C:
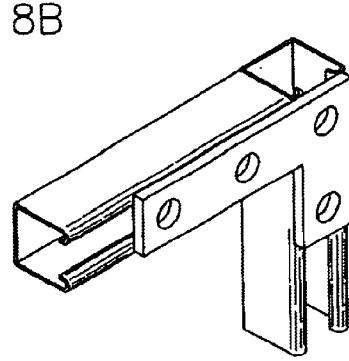

[0017] FIGURE 8A through 8C are perspective views of elements of the track assembly of the system according to a particularly preferred embodiment.

Figure 9:
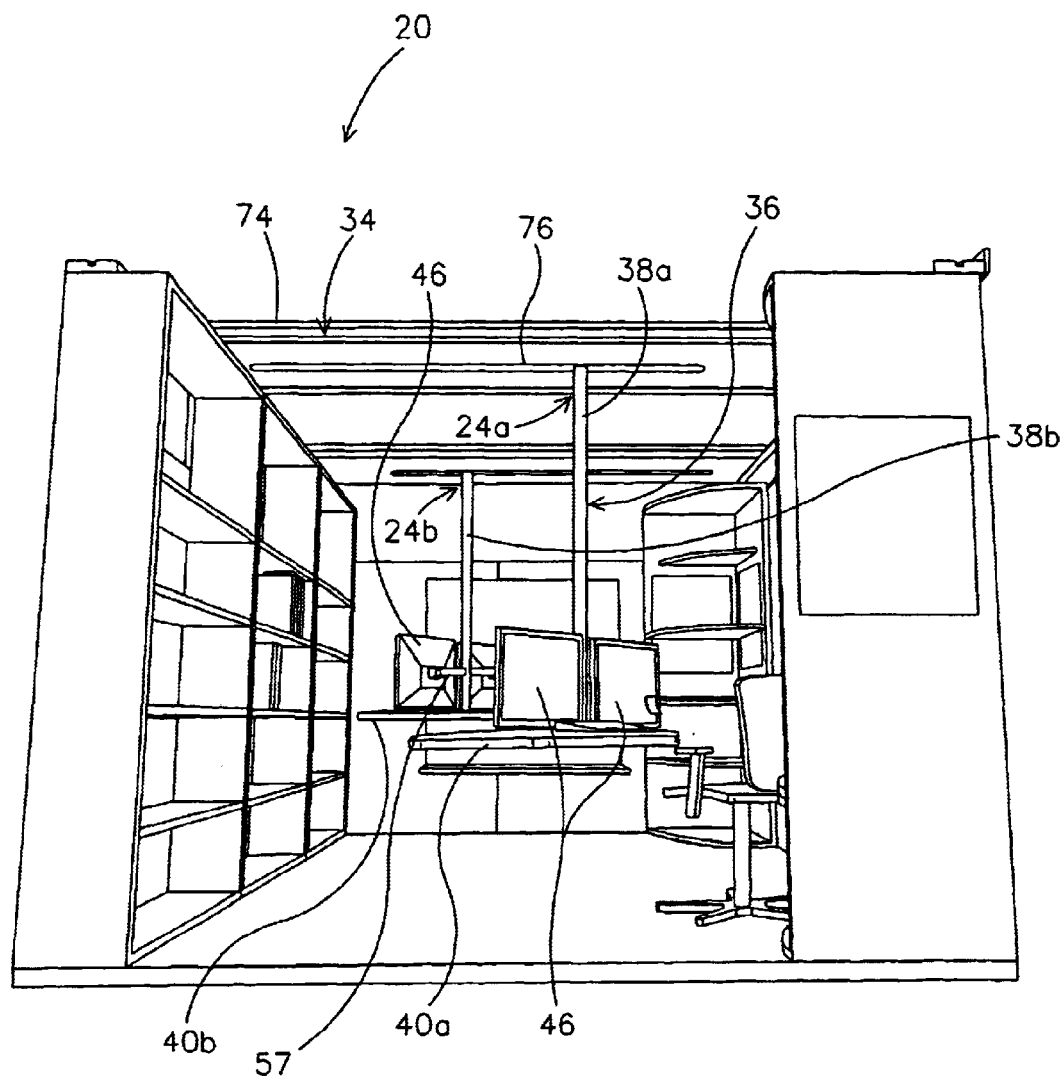
FIG. 9 is a perspective view of a support system in a work environment according to an alternative embodiment.

[0018] FIGURE 9 is a perspective view of a support system in a work environment according to an alternative embodiment.

Figure 10:
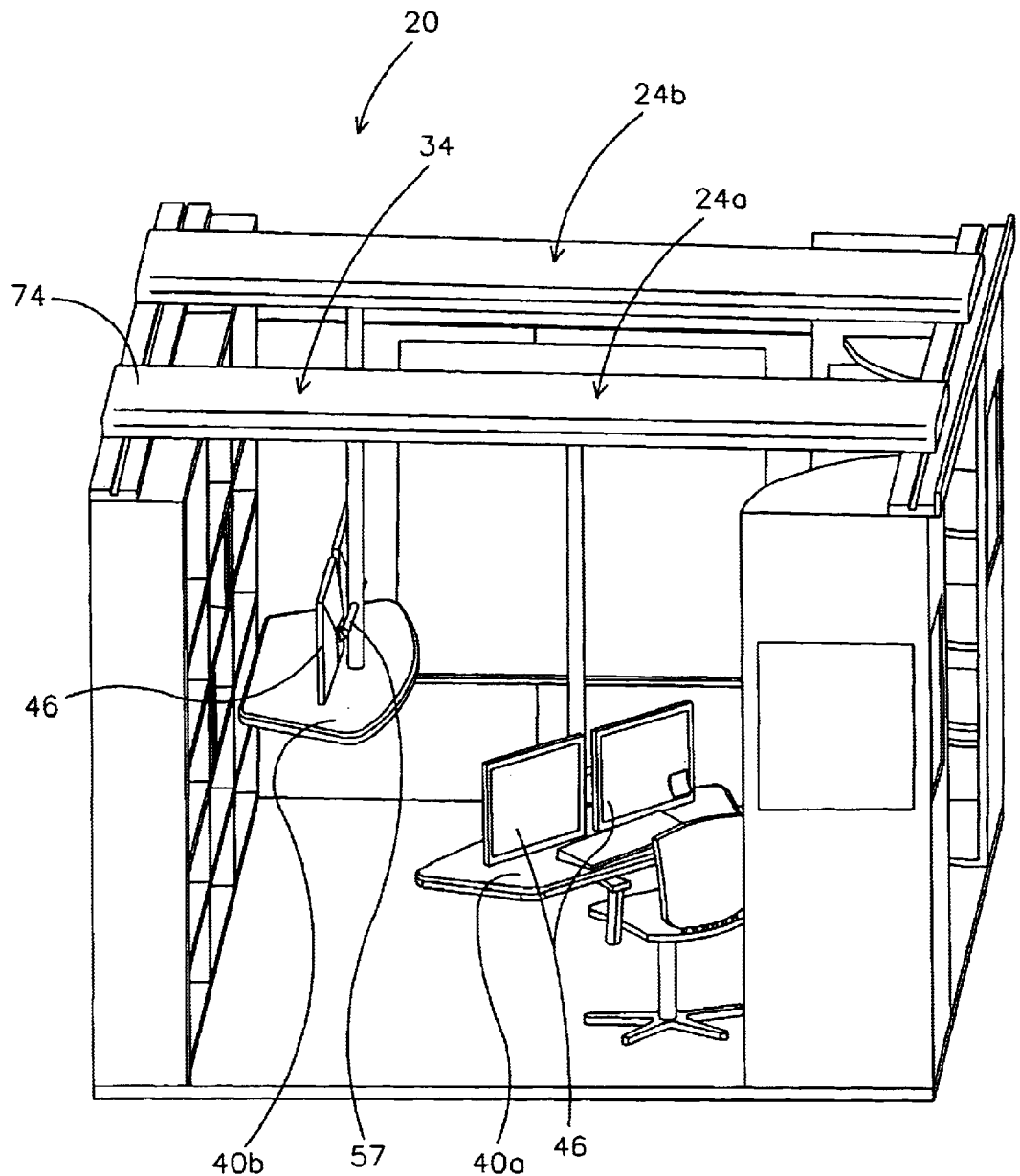
FIG. 10 is a perspective view of a support system in a work environment according to an alternative embodiment.
Figure 1:
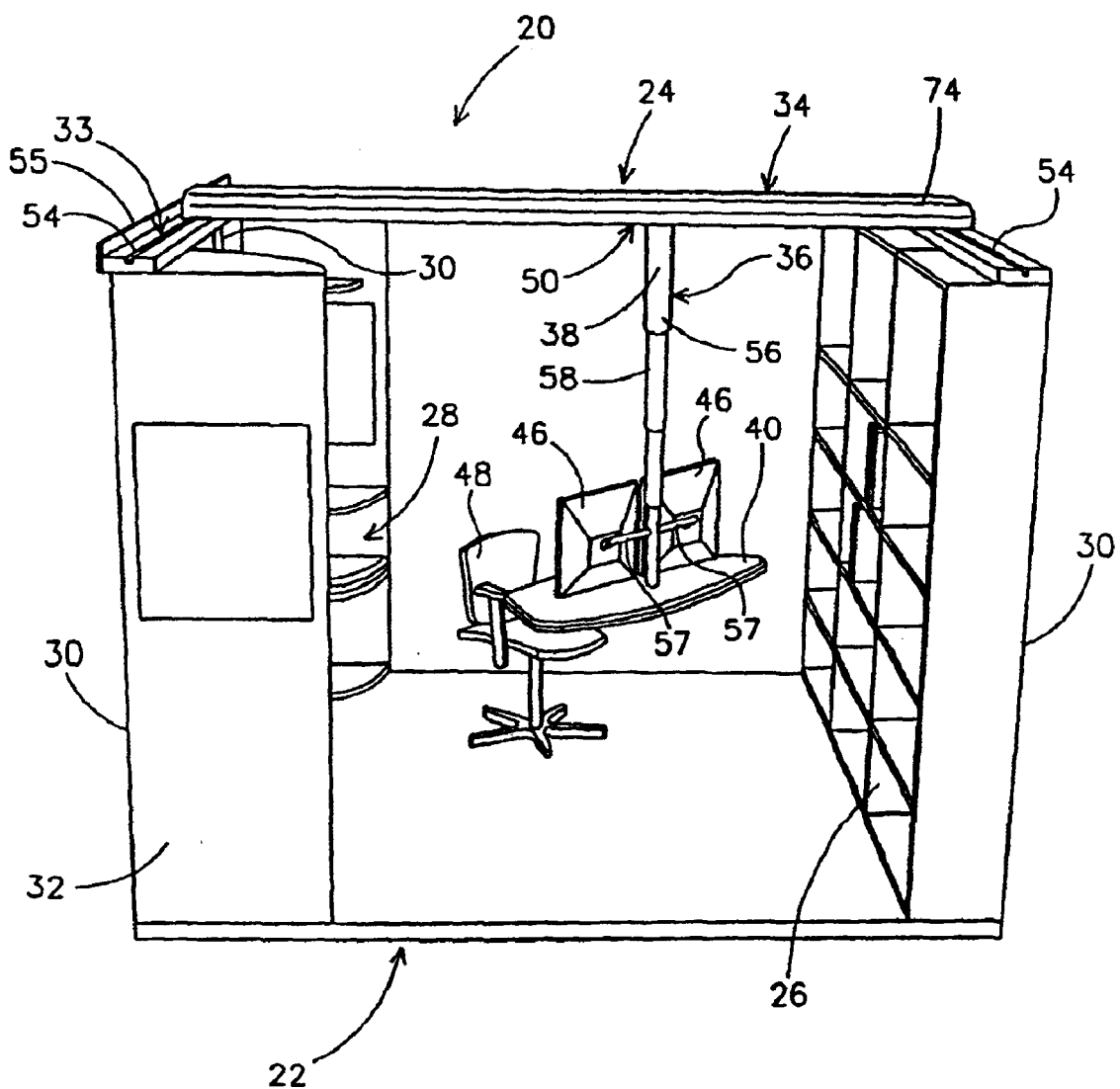
Figure 2:
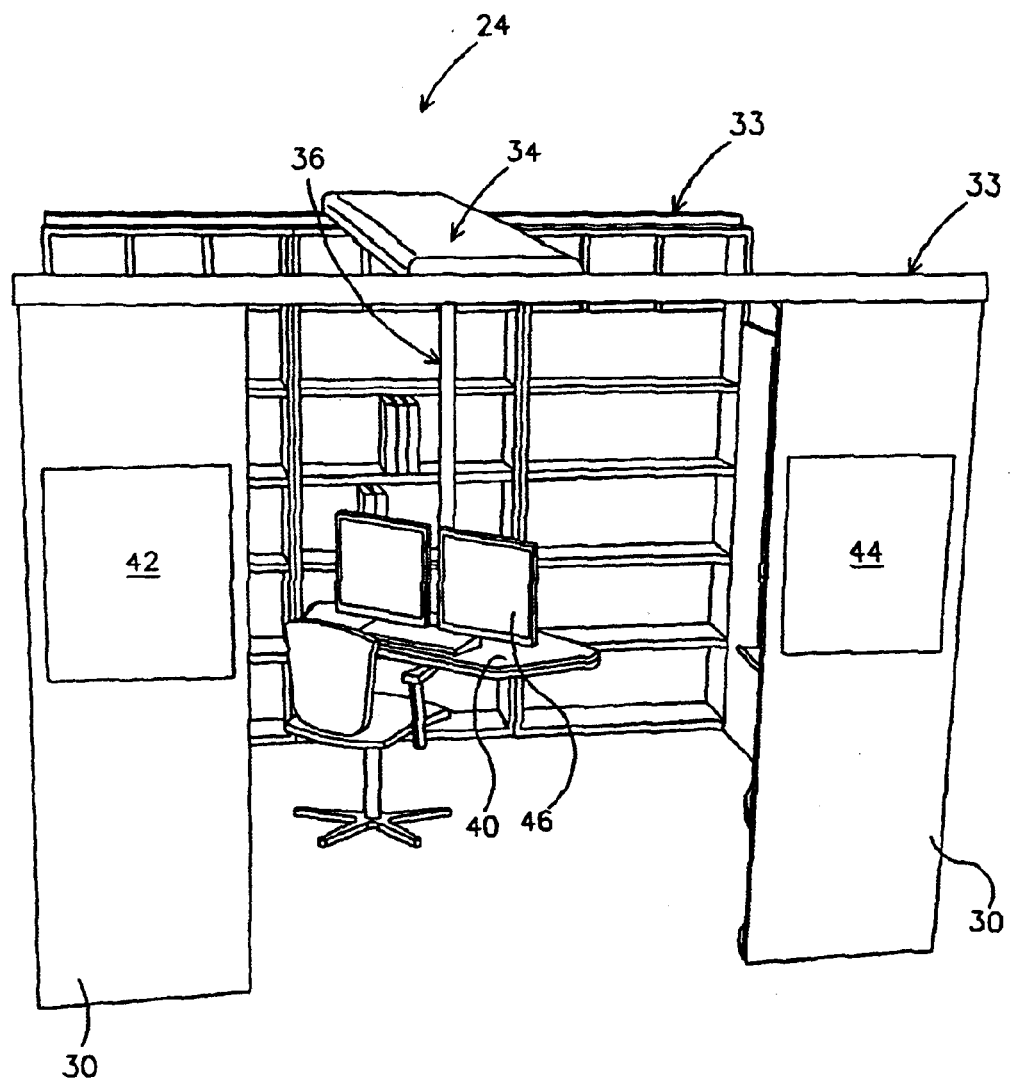
Figure 3:
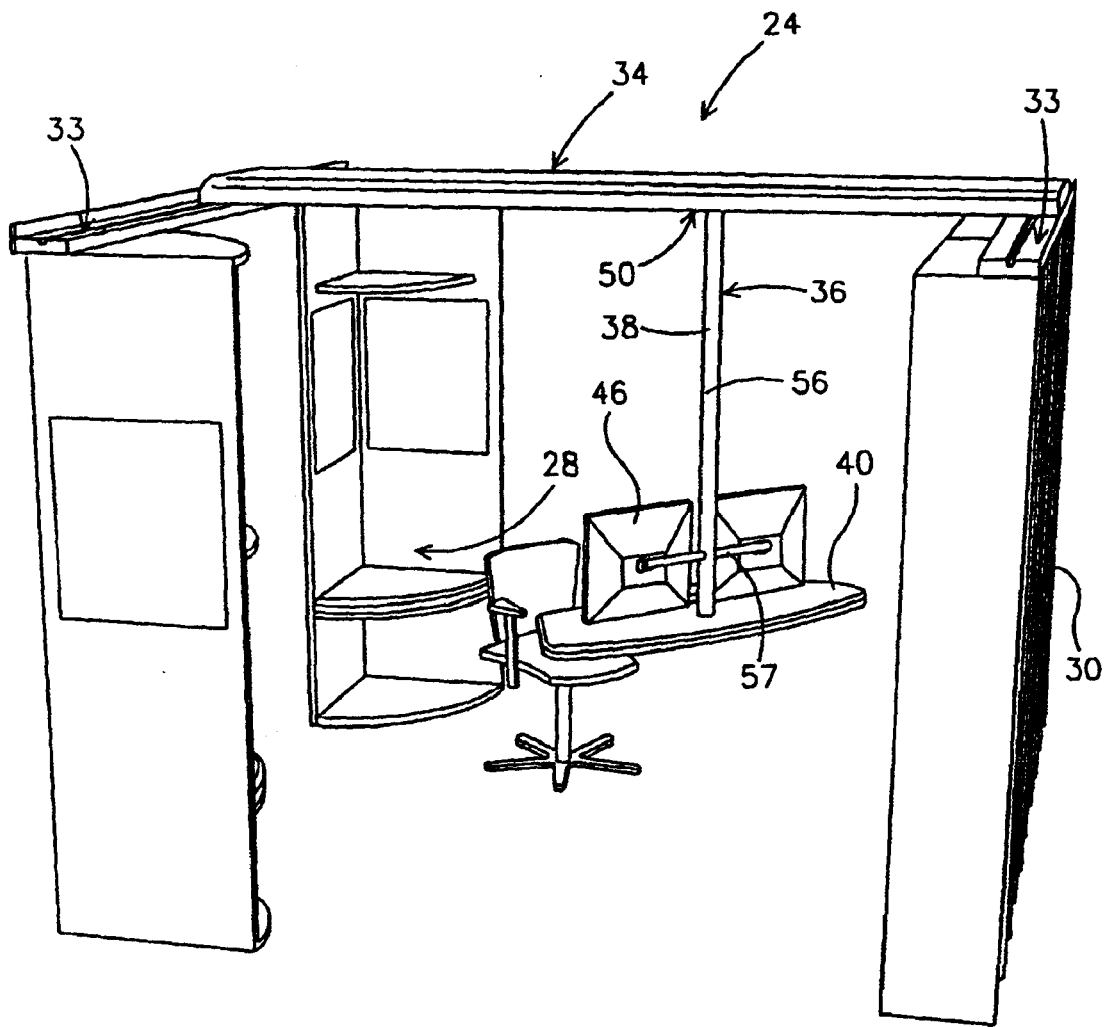
Figure 4:
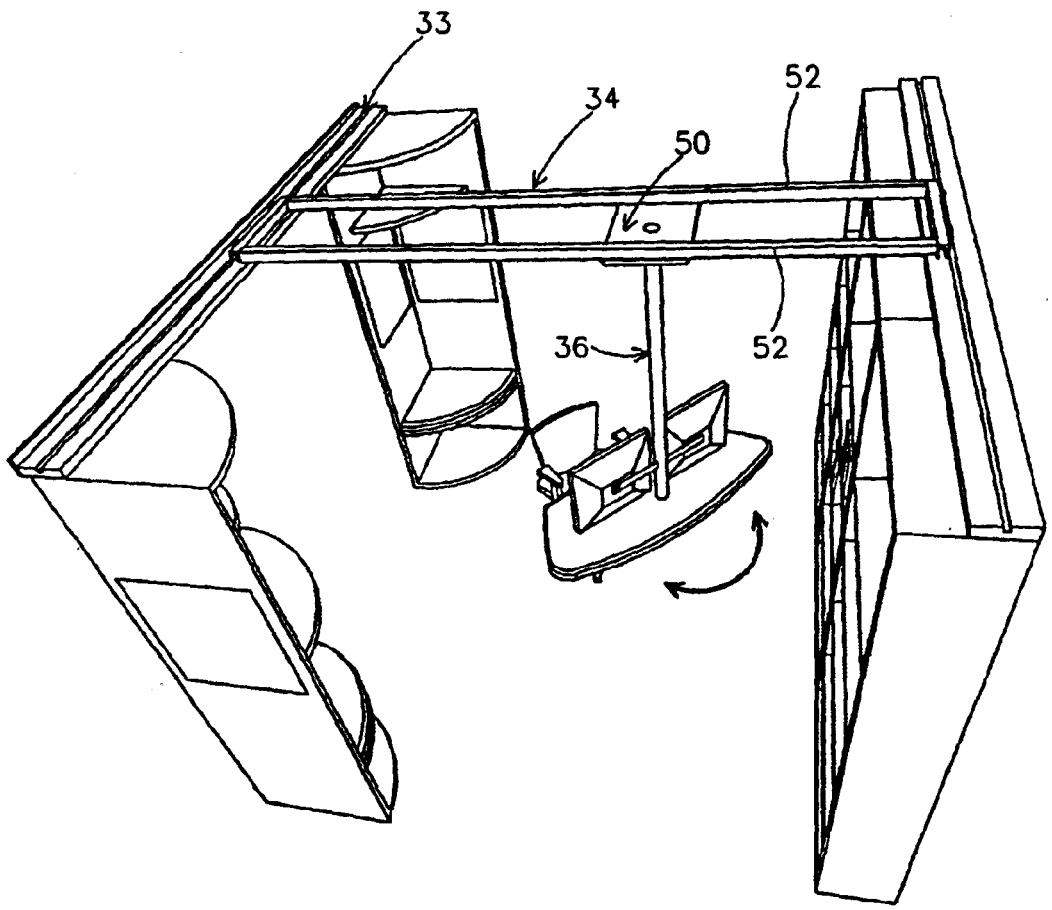
Figure 5:
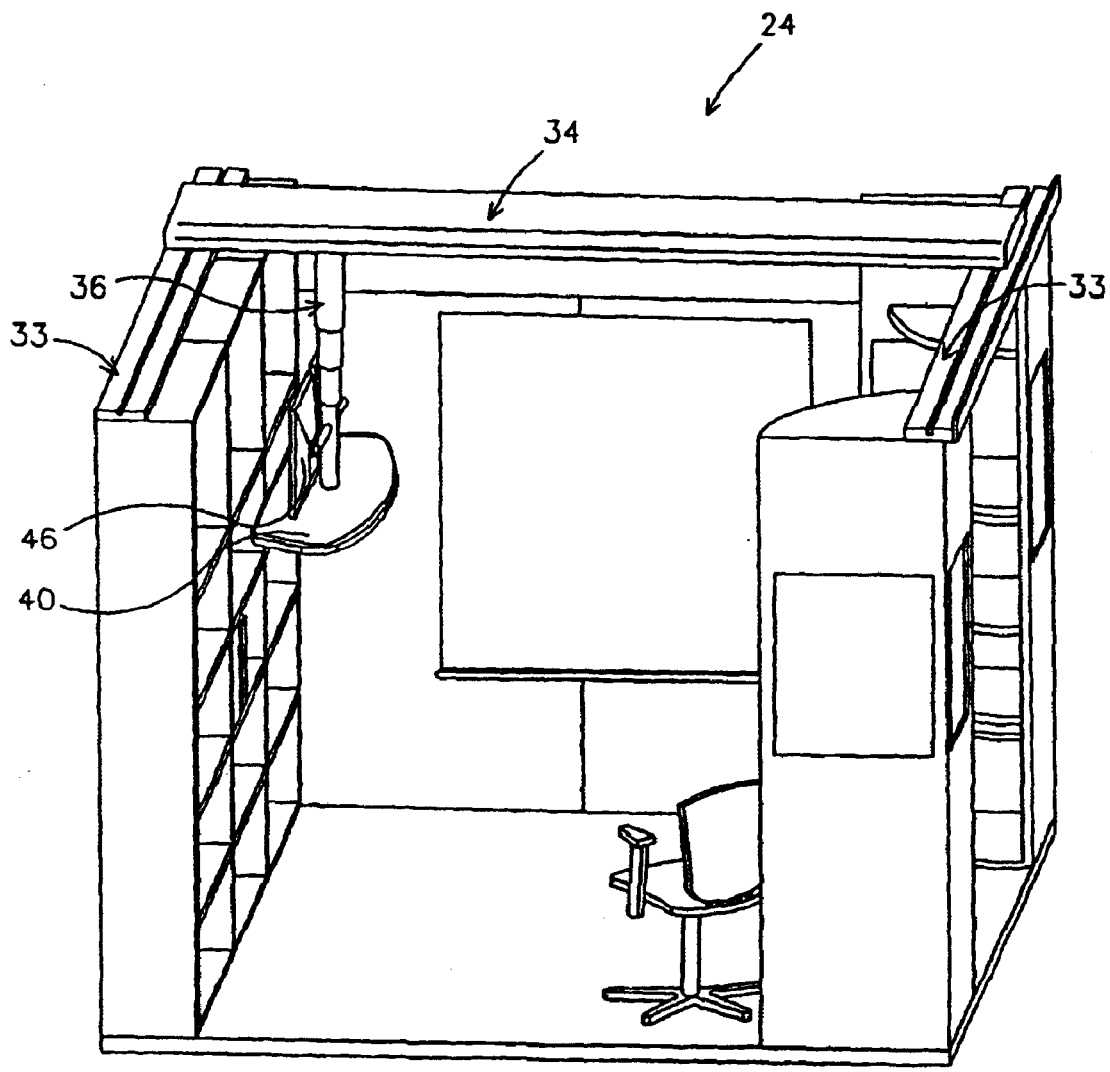
Figure 6:
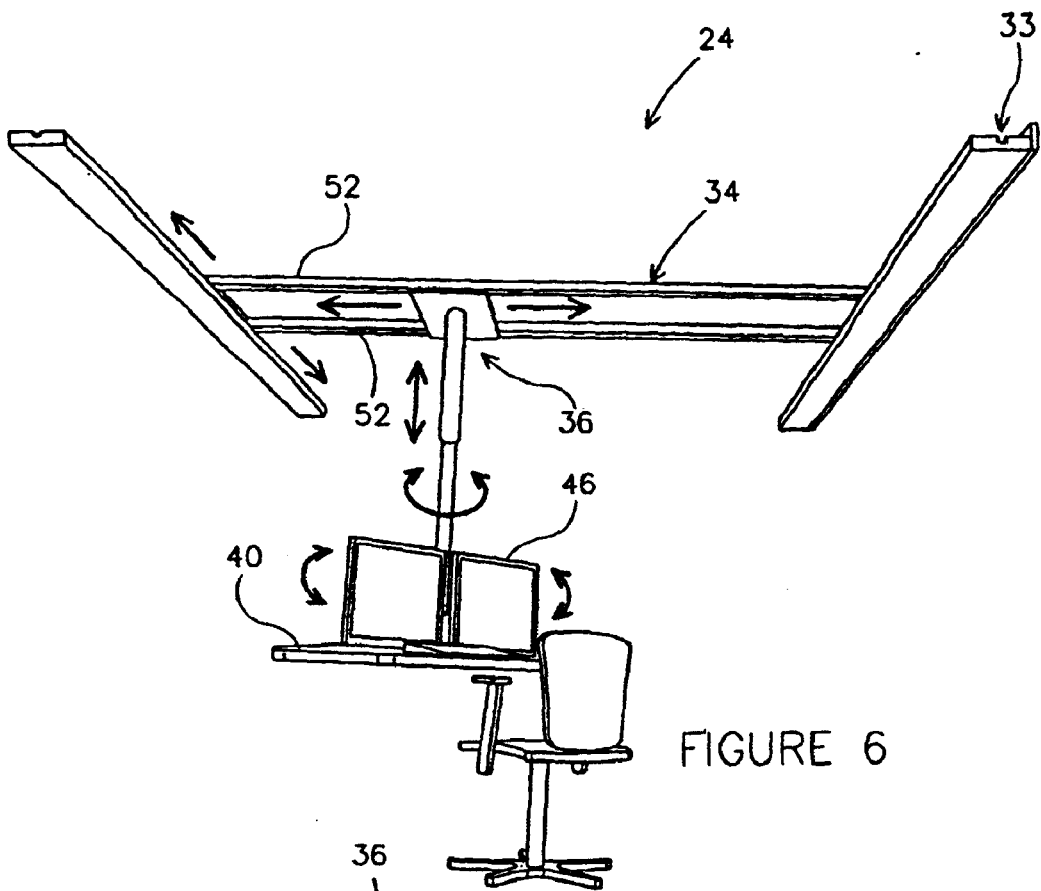
Figure 7:
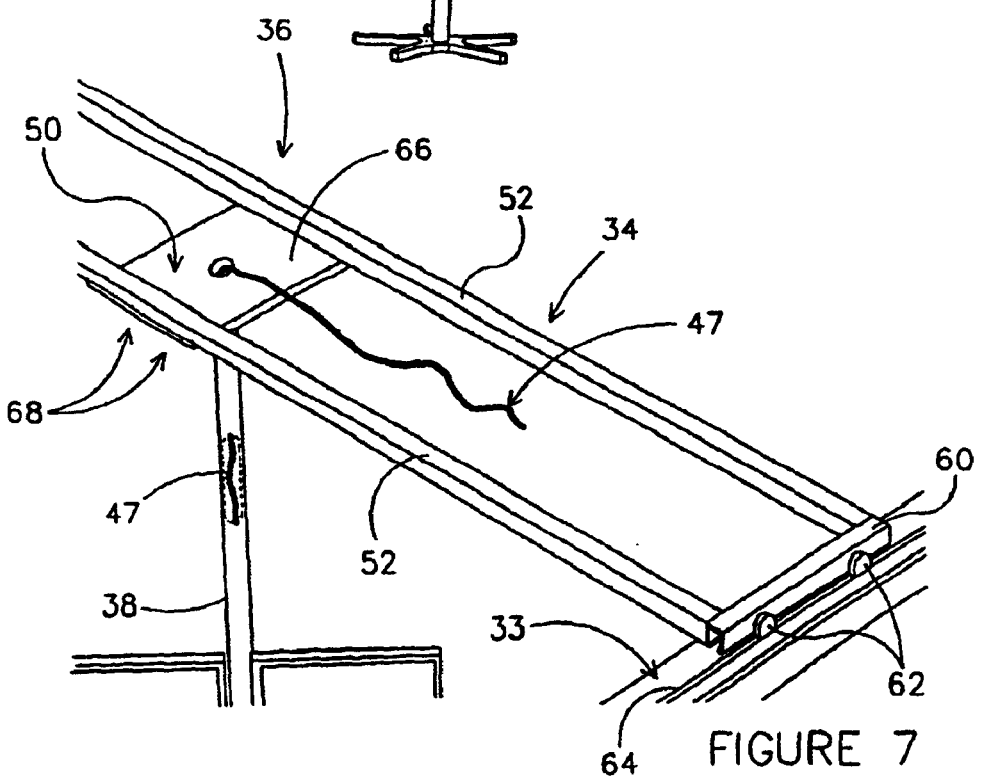
Figure 8A:
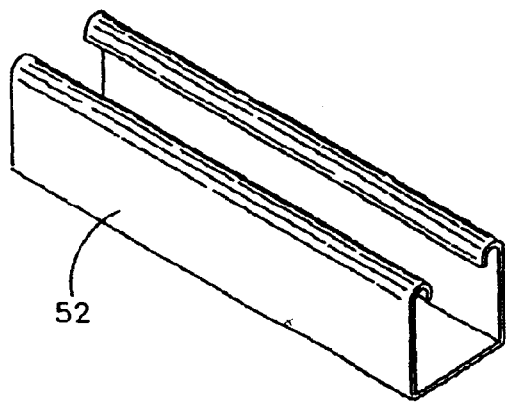
Figure 8A:
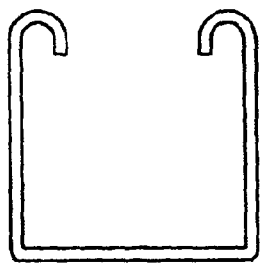
Figure 8B:
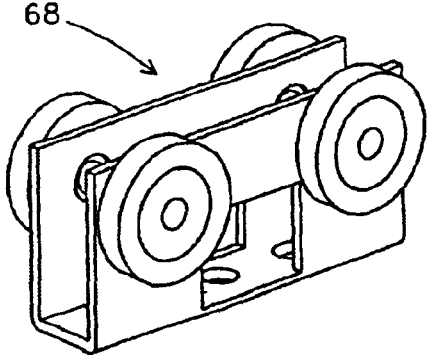
Figure 8B:
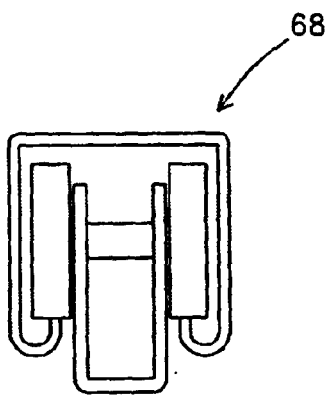
Figure 8C:
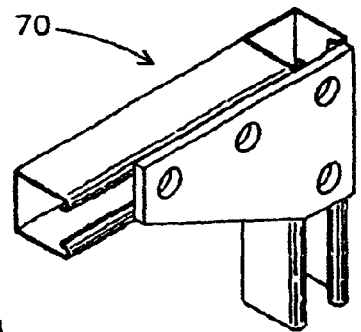
Figure 8C:
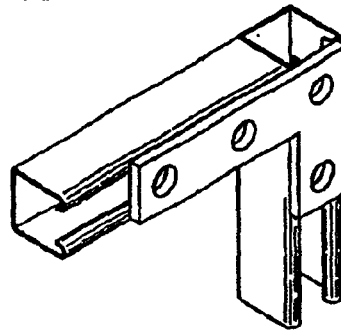
Figure 9:
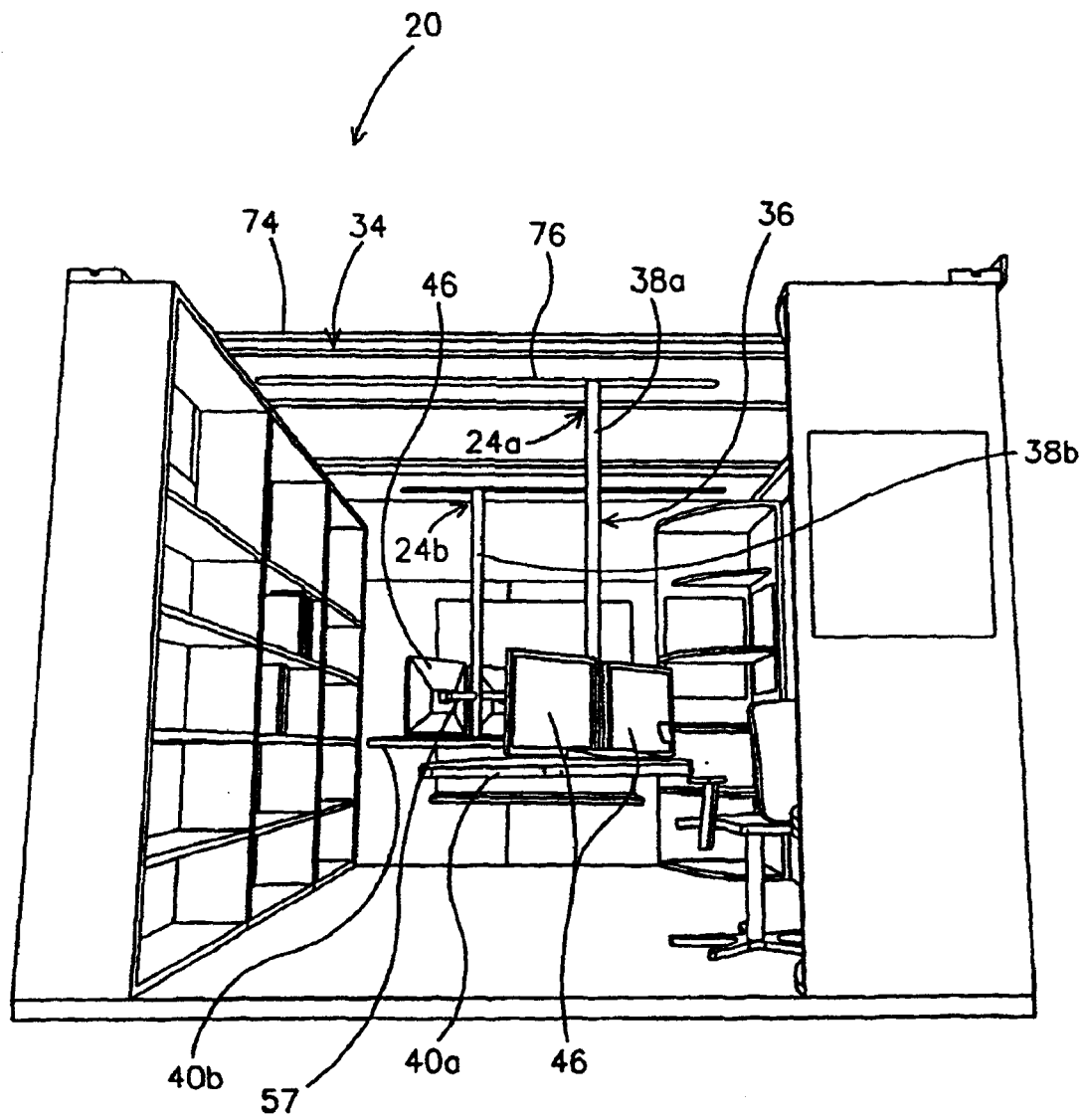
Figure 10:
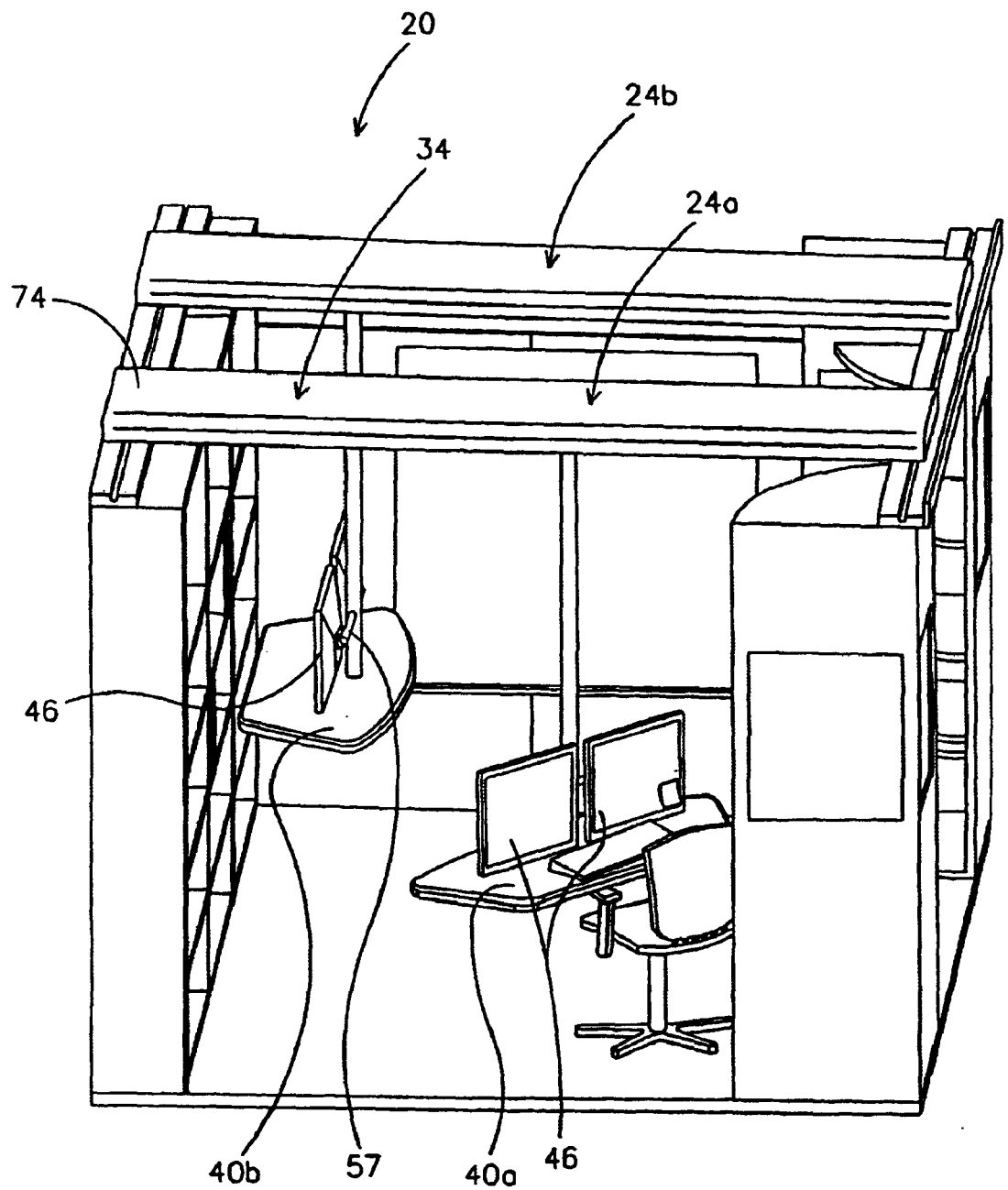

[0019] FIGURE 10 is a perspective view of a support system in a work environment according to an alternative embodiment.

DETAILED DESCRIPTION OF EXEMPLARY EMBODIMENTS

[0020] Referring to FIGURES 1 through 5, a work space 20 is shown including a workstation 22 configurable for use by one or a plurality of workers or other persons. Workstation 22 includes a movable office support system 24 along with other articles of furniture such as storage units shown as wall shelving units 26 and corner shelving units 28. The work space also provides walls shown as partial height partition walls including base walls 30 and side walls 32 (e.g. partial walls). Movable office support system 24 is installed through an elevated track system 33 associated with base walls 30 movably coupled to an elevated rail system 34. Support system 24 also includes a support assembly 36 providing a support 38 which is coupled to a worksurface 40.

[0021] Work space 20 also provides a wide variety of information display panels 42 and 44 (see FIGURE 2), lighting, privacy panels or screens, etc. Support system 24 is coupled within work space 20 for movement in a variety of horizontal and vertical directions to a variety of use and storage or stowed positions about or within work space 20 (for example, compare FIGURE 1 with FIGURE 5). As shown, support system 24 provides a worksurface 40; the support system may also provide one or more display panels 46. Also shown in work space 20 are chairs 48 (which can be of any conventional type, preferably mobile chairs).

[0022] Support assembly 36 includes a base or interface 50 coupled to rail system 34 for translating movement along a path of travel (e.g. linear or alternatively curved or other combinations of curved or linear paths at a fixed or variable height). Rail system 34 (shown as including two rails 52) is coupled to a track system 33 for translating movement along a path of travel. Track system 33 (shown as including tracks or guides 54 and braces 55, which coact with rails 52 to provide for controlled movement along track system 33) is installed upon a mounting structure or supporting members shown as walls 30. Support assembly 36 also includes a support 38 including a post 56 coupled to base 50. Support assembly 36 is coupled to a structure shown as worksurface 40; support assembly 36 is also shown as providing for attachment of an articulable structure or arm 57 (e.g. of any conventional type providing one or more "links" or "joints" for pivotal and/or translating movement) used to support an information display device shown as a display panel 46.

[0023] According to an exemplary embodiment, post 56 of support assembly 36 is pivotably coupled to base 50, for example to allow for rotation of worksurface 40 with respect to rail system 34 and/or track system 33. Support assembly 36 is also configured for movement of worksurface 40 with respect to base 50 in a vertical direction. According to a particularly preferred embodiment, the vertical movement of worksurface 40 may be accomplished through the coaction of two or more vertically "telescoping" segments 58 comprising support assembly 36; the outside and inner diameters of telescoping segments 58 of support assembly 36; progressively decrease (e.g. so that the outside diameter of a second segment fits within the inside diameter of a first segment, and the outside diameter of a third segment fits within the inside diameter of the second segment, etc.). Support assembly 36 is also configured for translating movement with base 50 in range (e.g. horizontal plane) of travel with movement of base 50 within rail system 34 and of rail system 34 along track system 33.

[0024] According to any preferred embodiment the worksurface and/or a display device coupled to the support system (although not supported by the floor) can be adjusted in spatial position within a horizontal plane and in a vertical direction within the work space. In a "stowed" position, as shown in FIGURE 5, worksurface 40 and/or a display device of support system 24 may be elevated (e.g. above a typical use height) and optionally at least partially concealed within a storage unit or other article of furniture. In any of the wide variety of "use" positions, worksurface 40 (and/or a display device) of support system 24 may be deployed and located within the substantial two- or three-dimensional range of motion provided by track system 33 and rail system 34 and rotatably and/or vertically adjustable support assembly 36. The position and orientation of each display device may also be adjusted by manipulation of the articulable arms.

[0025] As shown in FIGURES 6 and 7, according to a preferred embodiment, rail system 34 includes a bracket 60 providing wheels 62 which engage a slot 64 in track system 33; interface or base 50 of support assembly 36 includes plate 66 to which a set of roller guides 68 (shown in FIGURE 8B) which engage rails 52 are coupled, so that track system 33 and rail system 34 are transverse and provide for orthogonal movement of support system 24 (e.g. in an X-Y plane). In FIGURES 8A through 8C, rails 52 and roller guide 68 of rail system 34 and base 50 of support assembly 36 are shown (along with mounting arrangements 70 and 72 for the rails) according to a particularly preferred embodiment. According to a particularly preferred embodiment, these elements are of a type commercially available from Unistrut Corporation of Itasca, Illinois (a Tyco International Ltd. Company). According to alternative embodiments, the elements of the track system and the rail system may be any of a wide variety of different types providing suitable range of motion, structural strength and interoperability for the intended application. Guides or stops (e.g. mechanical stops or the like) or a locking mechanism may also be installed on either or both of track system or rail system to constrain the path of travel of the support.

[0026] As shown in FIGURES 9 and 10, work space 20a may provide two support systems 24a and 24b each with a corresponding worksurface 40a and 40b. A cover 74 may be provided on rail system 34 for aesthetic purposes or to provide an internal passage (not visible) for cables (not shown); cover has an open path 76 to allow movement of support assembly 36. An outlet for utilities may also be provided on or adjacent to worksurfaces 40a and/or 40b (or on supports 38a and/or 38b)) so that appliances may be connected to utilities. (Cables 47 providing connection to utilities are shown schematically in FIGURE 7 in relation to a passage through support assembly 36.)

[0027] According to any preferred embodiment, each articulable arm for coupling display device(s) to the support is selectively movable within a substantial range of motion. As shown, display devices shown as display panels 46 are coupled to arms 57 to allow suitably positioning and/or orientation for display of information in any of a variety of directions (e.g., up, down, laterally, pivotably) at each link or joint allowing articulation. The selective movement of base 50 and/or worksurface 40 and/or display panels 46 within work space 20 provides for substantial flexibility in the positioning and orientation and therefore use of worksurface 40 and/or one or more of display panels 46 within a range of motion within work space 20.

[0028] According to alternative embodiments, the support assembly may be configured for one information display device or two or more information display devices; the information display devices may be of any type, including flat display panels or other types of video monitors (e.g. CRT) or any other type of data or information display. The information display device may be associated with any type of appliance or device, such as a computing device or a television or network, etc.

* * *

[0029] In a conventional arrangement for associating a worksurface and/or display device within a work space, where the display device is positioned on a fixed worksurface, constraints are typically imposed upon the orientation of a user or users relative to the entrance of the work space or adjacent aisles or opportunities for potential shared zones for viewing the display device with others. For example, if the display device is positioned on a fixed worksurface to the back (or in one side or back corner) of the work space, the user of the work space may be constrained to work with her or his back to the entrance of the work space and information on the display device may be visible to those who enter the work space or walk along the adjacent aisle; if the display device is positioned on a fixed worksurface near the center or front of the work space, the user of the work space may be constrained to "work around" the worksurface and/or display device and may be less able to share information on the display device with those who enter the work space.

[0030] According to any preferred embodiment, the system will provide enhanced functionality in comparison with such conventional arrangements, and allow the worksurface and/or display device (or display devices) to be positioned selectively to enhance privacy or openness, or generally to facilitate the work to be performed in the work space; the system is intended to allow the repositioning (including physical placement and orientation) of the worksurface (and/or display device) to suit the needs of the worker. That is, according to any preferred embodiment of the system, the user or users (without having to adapt or adjust their own posture and/or position) will be able to adapt the positioning and orientation of the worksurface (and/or display device) for various use conditions.

* * *

[0031] According to other exemplary embodiments, the display devices may be associated with other articles of furniture and/or physical structures (such as panels, partitions, or walls). It is important to note that the term "article of furniture" is intended to be a broad term and not a term of limitation. The term "article of furniture," as used in this disclosure, may include, without limitation: systems furniture (e.g., partition wall systems, architectural walls, space frames, work stations, etc.), casegoods (e.g., file cabinets, storage bins, containers, closets, etc.), seating products (e.g., chairs, stools, lounges, etc.), work surfaces (e.g., tables, desk systems, credenzas, etc.), lighting systems, and other accessories.

* * *

[0032] It is important to note that the term "information" is intended to be a broad term and not a term of limitation. The term "information" may include information of any type or form or combination. It is also important to note that the terms "worksurface" and "work environment" are intended to be given broad scope and are terms of limitation. It is further important to note that the construction and arrangement of the elements of the system as shown in the preferred and other exemplary embodiments is illustrative only.

[0033] Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

1. (Currently Amended) A movable support system for use in a work space such as an office, comprising:

a track system above at least a portion of the office;

a support movably coupled to the track system and configured to project downward into the office;

a worksurface coupled to the support;

wherein the worksurface may be brought into use in multiple locations about the office; and wherein the track system is supported at least in part by an article of furniture selected from the group consisting of a bookcase, a storage unit, a shelving unit, a file cabinet, and a credenza.

2. (Original) The system of Claim 1 further comprising at least one display device coupled to the support.

3. (Original) The system of Claim 1 further comprising at least one worksurface and at least one display device.

4. (Original) The system of Claim 1 further comprising a rail system movably coupled to the track system and wherein the support is movably coupled to the track system through the rail system.

5. (Original) The system of Claim 1 wherein the support is configured for vertical position adjustment of the worksurface.

6. (Original) The system of Claim 5 wherein the support provides for telescopic height adjustment for the worksurface.

7. (Original) The system of Claim 1 wherein the track system includes two overhead tracks.

8. (Original) The system of Claim 7 wherein track system is linear.

9. (Original) The system of Claim 7 wherein the track system is permanently mounted to a structure within the office.

10. (Original) The system of Claim 7 wherein the track system is mounted on opposed walls of the office.

11. (Currently Amended) The system of Claim 1 wherein the track system allows for placement of the support in a stowed position.

12. (Currently Amended) The system of Claim 1 wherein the track system is elevated.

13. (Currently Amended) The system of Claim 1 wherein the support is configured for management of cables providing utilities such as power or voice or data to the worksurface.

14. (Original) The system of Claim 1 further comprising two display devices coupled to the support.

15. (Original) The system of Claim 1 wherein at least one display device is directly coupled to the support.

16. (Original) The system of Claim 4 wherein the rail system includes a cover.

17. (Original) The system of Claim 1 wherein the worksurface is not supported on a floor of the office.

18. (Original) The system of Claim 4 wherein the rail system is linear.

19. (Original) The system of Claim 4 wherein the rail system provides a pair of rails and the support includes a base installed between the pair of rails.

UNITED STATES PATENT AND TRADEMARK OFFICE
CERTIFICATE OF CORRECTION

| | | |
|---|---|---|
| PATENT NO. | : 6,739,096 B2 | Page 1 of 18 |
| DATED | : May 25, 2004 | |
| INVENTOR(S) | : Thomas G. Felpausch, Carl V. Forslund III and Mark A. Baloga | |

It is certified that error appears in the above-identified patent and that said Letters Patent is hereby corrected as shown below:

<u>Title page</u>,
Item [57], ABSTRACT, replace with the attached:

<u>Column 1, line 5 through Column 6, line 14,</u>
The entire specification should be replaced with the attached:

This certificate supersedes Certificate of Correction issued September 28, 2004.

Signed and Sealed this

Eleventh Day of April, 2006

JON W. DUDAS
*Director of the United States Patent and Trademark Office*

(12) United States Patent
Feldpausch et al.

(10) Patent No.: US 6,739,096 B2
(45) Date of Patent: May 25, 2004

(54) MOVABLE OFFICE SUPPORT SYSTEM

(75) Inventors: Thomas G. Feldpausch, Hastings, MI (US); Carl V. Forslund, III, East Grand Rapids, MI (US); Mark A. Baloga, East Grand Rapids, MI (US)

(73) Assignee: Steelcase Development Corporation, Caledonia, MI (US)

(*) Notice: Subject to any disclaimer, the term of this patent is extended or adjusted under 35 U.S.C. 154(b) by 50 days.

(21) Appl. No.: 09/888,069

(22) Filed: Jun. 22, 2001

(65) Prior Publication Data

US 2002/0194792 A1 Dec. 26, 2002

(51) Int. Cl.$^7$ .................................................. A49H 1/10
(52) U.S. Cl. .............................. 52/36.1; 52/29; 248/327; 248/333
(58) Field of Search ...................... 248/327, 333, 298.1, 248/918; 52/36.1, 36.2, 29, 733.1

(56) References Cited

U.S. PATENT DOCUMENTS

| | | |
|---|---|---|
| 119,054 A | 9/1871 | Shryock |
| 241,925 A | 5/1881 | Cadwell |
| 249,198 A | 11/1881 | Moon |
| 253,538 A | 2/1882 | McLane |
| 475,126 A | 5/1892 | Lorenz |
| 549,347 A | 11/1895 | Clark |
| 605,148 A | 6/1898 | Sylvester |
| 621,835 A | 3/1899 | MacDonald |
| 627,396 A | 6/1899 | Daly |
| 713,417 A | 11/1902 | Feldmann, Jr. et al. |
| 821,144 A | 5/1906 | Walsh |
| 943,821 A | 12/1909 | Feldmann, Jr. |
| 950,006 A | 2/1910 | McCarty |
| 955,586 A | 4/1910 | Emerich |

(List continued on next page.)

FOREIGN PATENT DOCUMENTS

| | | |
|---|---|---|
| AT | 164466 | 11/1949 |
| DE | 232680 | 3/1964 |
| DE | 1 561 580 | 4/1970 |
| DE | 3132015 | 10/1982 |
| GB | 124334 | 3/1919 |
| GB | 2127682 | 4/1984 |
| JP | 3-93944 | 4/1991 |
| JP | 3-93946 | 4/1991 |

OTHER PUBLICATIONS

U.S. Patent Application titled Workstation, U.S. Appl. No. 09/183,023 filed on Oct. 30, 1998; 106 pages, Figures 1-33 listing inventors Mark A. Baloga and Carl V. Forslund III.

U.S. Patent Application titled Movable Display Support System, U.S. Appl. No. 09/887,519 filed on Jun. 22, 2001; 22 pages, Figures 1-6 listing inventors Mark A. Baloga, Carl V. Forslund III and Thomas G. Feldpausch.

(List continued on next page.)

*Primary Examiner*—Carl D. Friedman
*Assistant Examiner*—Basil Katcheves
(74) *Attorney, Agent, or Firm*—Foley & Lardner

(57) ABSTRACT

A movable support system for use in a work space such as an office is disclosed, having a track system above at least a portion of the office with a support movably coupled to the track system and configured to project downward into the office. A worksurface is coupled to the support so that the worksurface may be brought into use in multiple locations about the office. A movable support system for an office is also disclosed, having an overhead track system configured to project over at least a portion of the office, a support slidingly suspended from the overhead track system and configured to hang downward into the office, and at least one display device coupled to the support so that the worksurface may be brought into use in multiple locations about the office.

74 Claims, 9 Drawing Sheets

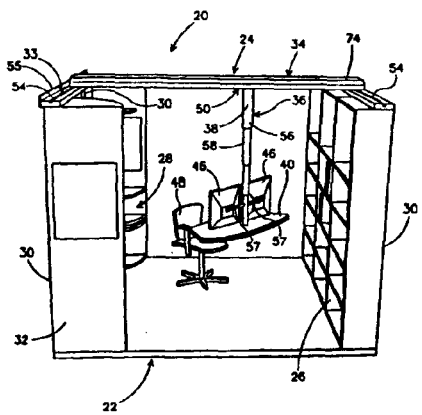

U.S. PATENT DOCUMENTS

| | | |
|---|---|---|
| 997,866 A | 7/1911 | Smith |
| 1,086,236 A | 2/1914 | Staples |
| 1,116,484 A | 11/1914 | Ralph |
| 1,122,926 A | 12/1914 | Hick |
| 1,141,404 A | 6/1915 | Moseley |
| 1,203,659 A | 11/1916 | Smith |
| 1,254,036 A | 1/1918 | Grant |
| 1,326,832 A | 12/1919 | Baily |
| 1,457,990 A | 6/1923 | Morgan |
| 1,599,888 A | 9/1926 | Haskell |
| 1,688,456 A | 10/1928 | Dolph |
| 1,770,755 A | 7/1930 | Kleinpell |
| 1,826,469 A | 10/1931 | Hunt et al. |
| 1,881,636 A | 10/1932 | Johnson et al. |
| 1,887,539 A | 11/1932 | Brown |
| 1,943,629 A | 1/1934 | Schwartz |
| 1,958,579 A | 5/1934 | Johnson et al. |
| 2,070,408 A | 2/1937 | Leidgen |
| 2,144,083 A | 1/1939 | Rentfrow, Sr. |
| 2,182,703 A | 12/1939 | Rainwater ................ 45/6 |
| 2,348,414 A | 5/1944 | Pierce |
| 2,589,803 A * | 3/1952 | Haley ................ 104/94 |
| 2,691,238 A | 10/1954 | Svatos |
| 2,713,609 A * | 7/1955 | Niklason ................ 248/163.1 |
| 2,778,512 A * | 1/1957 | Strona ................ 212/74 |
| 2,812,067 A | 11/1957 | Gussack |
| 2,870,459 A | 1/1959 | Zabielski |
| 2,886,182 A | 5/1959 | Dauman |
| 2,928,555 A | 3/1960 | Childs et al. |
| 2,963,332 A | 12/1960 | Breuning |
| 2,979,155 A * | 4/1961 | Scharfenberger ............ 182/222 |
| 3,017,999 A | 1/1962 | Cano |
| 3,042,978 A | 7/1962 | Eames et al. |
| 3,078,133 A | 2/1963 | Schauer |
| 3,141,207 A | 7/1964 | Kahler |
| 3,181,274 A | 5/1965 | Izenour |
| 3,251,477 A | 5/1966 | Parstorfer |
| 3,286,382 A | 11/1966 | Newman |
| 3,351,211 A | 11/1967 | Best |
| 3,391,796 A | 7/1968 | Cross |
| 3,412,868 A | 11/1968 | Carter |
| 3,425,568 A | 2/1969 | Albright |
| 3,514,883 A | 6/1970 | Albright |
| 3,557,499 A | 1/1971 | Dickie et al. |
| 3,683,100 A | 8/1972 | Deal et al. |
| 3,732,633 A | 5/1973 | Margolis et al. |
| 3,760,952 A | 9/1973 | White |
| 3,777,896 A | 12/1973 | Ehrlich |
| 3,797,146 A | 3/1974 | Holes |
| 3,883,972 A | 5/1975 | Propst et al. |
| 3,921,320 A | 11/1975 | McWilliams |
| 3,924,749 A | 12/1975 | Weston |
| 3,955,788 A | 5/1976 | Delage ................ 248/228 |
| 3,975,837 A | 8/1976 | Baars |
| 3,984,930 A | 10/1976 | Booland |
| 4,033,058 A | 7/1977 | Lyman |
| 4,135,775 A | 1/1979 | Driscoll |
| 4,166,332 A | 9/1979 | Donovan |
| 4,180,298 A | 12/1979 | Borgerson, Jr. |
| 4,194,313 A | 3/1980 | Downing |
| 4,239,170 A | 12/1980 | Planebo |
| 4,270,290 A | 6/1981 | Eckert |
| 4,323,291 A | 4/1982 | Ball |
| 4,360,240 A | 11/1982 | Koncelik et al. |
| 4,360,991 A | 11/1982 | West |
| 4,428,136 A | 1/1984 | Franklin |
| 4,447,973 A | 5/1984 | Wihlke |
| 4,457,436 A | 7/1984 | Kelley |
| 4,478,467 A | 10/1984 | Tyndall |
| 4,561,619 A | 12/1985 | Robillard et al. |
| 4,569,448 A | 2/1986 | Graham |
| 4,606,394 A | 8/1986 | Bannister |
| 4,620,635 A | 11/1986 | Morand |
| 4,637,666 A | 1/1987 | Worrell et al. ............ 312/196 |
| 4,658,966 A | 4/1987 | Broek |
| 4,659,048 A | 4/1987 | Fahrion ................ 248/285 |
| 4,715,154 A | 12/1987 | Baloga |
| 4,723,665 A | 2/1988 | Benedict et al. |
| 4,723,821 A | 2/1988 | Montgomery |
| 4,732,089 A | 3/1988 | Mueller ................ 108/102 |
| 4,750,305 A | 6/1988 | Bastian |
| 4,793,495 A | 12/1988 | Preu |
| 4,805,331 A | 2/1989 | Boggess et al. |
| 4,852,500 A | 8/1989 | Ryburg et al. ............ 108/105 |
| 4,902,229 A | 2/1990 | Pedersen et al. |
| 4,913,297 A | 4/1990 | Wells |
| 4,979,785 A | 12/1990 | Richards |
| 4,986,194 A | 1/1991 | Bollman ................ 108/111 |
| 5,090,171 A | 2/1992 | Kano et al. |
| 5,108,063 A * | 4/1992 | Koerber et al. ............ 248/284.1 |
| 5,109,994 A | 5/1992 | Kidd et al. |
| 5,112,020 A | 5/1992 | Ginsberg |
| 5,125,202 A | 6/1992 | Kissinger |
| 5,139,155 A | 8/1992 | Laxson |
| 5,160,050 A | 11/1992 | Russo |
| 5,161,321 A | 11/1992 | Kuhnke |
| 5,181,334 A | 1/1993 | Mima |
| 5,214,885 A | 6/1993 | Maas et al. |
| 5,226,548 A | 7/1993 | Koeppel |
| 5,241,796 A | 9/1993 | Hellwig et al. |
| 5,282,341 A | 2/1994 | Baloga et al. |
| 5,289,926 A | 3/1994 | Lewis et al. |
| 5,290,002 A | 3/1994 | Cohen |
| 5,301,477 A | 4/1994 | Rellinger et al. |
| 5,309,686 A | 5/1994 | Underwood et al. |
| 5,321,579 A | 6/1994 | Brown et al. |
| 5,375,802 A | 12/1994 | Branham, II |
| 5,379,977 A * | 1/1995 | Ronn et al. ............ 248/277.1 |
| 5,384,999 A | 1/1995 | Roche et al. |
| 5,392,934 A | 2/1995 | Fox |
| 5,394,631 A | 3/1995 | Bosio |
| 5,405,117 A * | 4/1995 | Davis ................ 248/323 |
| 5,406,761 A | 4/1995 | Hobbiebrunken et al. |
| 5,422,155 A | 6/1995 | Spence, Jr. |
| 5,428,928 A | 7/1995 | Hellwig et al. |
| 5,486,391 A | 1/1996 | Tyner |
| 5,495,953 A | 3/1996 | Bearth |
| 5,503,278 A | 4/1996 | Ishmael |
| 5,511,348 A | 4/1996 | Cornell et al. |
| 5,513,574 A | 5/1996 | Collins |
| 5,536,080 A | 7/1996 | Madimenos et al. |
| 5,537,290 A | 7/1996 | Brown et al. ............ 361/681 |
| 5,558,418 A | 9/1996 | Lambright et al. |
| 5,584,546 A | 12/1996 | Gurin et al. |
| 5,588,659 A | 12/1996 | Boes et al. |
| 5,590,940 A | 1/1997 | Richard |
| 5,607,214 A | 3/1997 | Pierce et al. |
| 5,609,112 A | 3/1997 | Meyer et al. |
| 5,635,265 A | 6/1997 | Potokar |
| 5,649,631 A | 7/1997 | Loflin |
| 5,669,518 A * | 9/1997 | Kundel ................ 104/94 |
| 5,675,946 A | 10/1997 | Verbeek et al. |
| 5,687,499 A | 11/1997 | Brnjac |
| 5,687,513 A | 11/1997 | Baloga et al. |
| 5,694,881 A | 12/1997 | Creech |
| 5,695,264 A | 12/1997 | Koch |
| 5,724,778 A | 3/1998 | Cornell et al. |
| 5,743,193 A | 4/1998 | Kakuta et al. |
| 5,746,330 A | 5/1998 | DiBetta |
| 5,765,315 A | 6/1998 | Nagamitsu et al. |
| 5,826,385 A | 10/1998 | Dykstra et al. |

| | | |
|---|---|---|
| 5,826,639 A | 10/1998 | Miller |
| 5,829,202 A | 11/1998 | Canton Gongora et al. |
| 5,831,211 A | 11/1998 | Gartung et al. |
| 5,848,698 A | 12/1998 | Stompe |
| 5,873,205 A | 2/1999 | Hanlon et al. |
| 5,901,513 A | 5/1999 | Mollenkopf et al. |
| 5,904,328 A | 5/1999 | Leveridge et al. |
| 5,931,429 A | 8/1999 | Hellwig et al. |
| 5,941,713 A | 8/1999 | Wayner et al. |
| 5,952,796 A * | 9/1999 | Colgate et al. ............ 318/1 |
| 5,966,879 A | 10/1999 | Verbeek et al. |
| 5,984,441 A | 11/1999 | Stokhuijzen |
| 6,048,044 A | 4/2000 | Biggel et al. |
| 6,076,317 A | 6/2000 | Hellwig et al. |
| 6,099,093 A | 8/2000 | Spence |
| 6,244,991 B1 * | 6/2001 | Bingham ............ 482/69 |
| 6,249,999 B1 | 6/2001 | Börge et al. |
| 6,275,375 B1 | 8/2001 | Nam |
| 6,317,316 B1 | 11/2001 | Bentley et al. |
| 6,343,006 B1 | 1/2002 | Moscovitch et al. |
| 6,409,134 B1 | 6/2002 | Oddsen, Jr. |

OTHER PUBLICATIONS

Progetto 25.90, cover and inside page of brochure along with pp. 12–13, bearing a date designation of 1991.

M.A. Baloga, C.V. Forslund III, et al., Compilation titled "Bluespace" dated Aug. 29, 2000 (internal document proprietary to Steelcase Inc.).

Brochure by UNIFOR titled "Panelli PL" (undated) (37 sheets).

Brochure by UNIFOR titled "Progetto 25.90" (undated) (19 sheets).

Promotional material (chart) by Dowing Displays of Milford, Ohio, showing models (no date), (8 color sheets).

Promotional material for "The Office of the Future", by Tarrant Interiors—of Fort Worth, Texas, (no date), (4 sheets).

Innamorati, Francesco, "The Telematic Tree", Habitat Ufficio, bearing a designation 1991 (5 sheets).

Advertisement for "Ameriwood Oak Armoire", by Office Max, bearing a designation "Nov. 11, 1995", (1 sheet).

Gertsakis, John, "Durable Yet Future Proof", bearing a designation "© 1996", National Key Centre for Design at RMIT, from Internet site: www.cfd.rmit.edu.au/outcomes/erdnews/ERD6/HOTdesk.html on Oct. 27, 1998 (3 sheets).

Promotional materials for "A World of Possibilities, Introducing Contrada™. The Next Generation in Office Furniture.", by Trendway Corporation of Holland, Michigan, bearing a designation "©1998" (8 sheets).

Promotional material for "Village Wall," By Tellus Furniture a Paoli Company of Orleans, Indiana, bearing a designation "©1998 Tellus Furniture", (8 color sheets).

Yates, JoAnne, "Graphic ROI Reporting," Knowledge Management at 106, (Oct. 1998) (2 sheets).

Brochure for "TooGo New Workplace Solutions", by Egan Visual, bearing a designation "©Copyright Egan Visual 1999", (16 color sheets).

Catalog pages for "Details" a Steelcase Company, with a Mar. 2001 indication, "© 2001 Office Details Inc." (6 color sheets).

U.S. Patent Appl. No. 09/182,998, titled "Information Display System" as filed on Oct. 30, 1998, including specification, claims, drawings and abstract (104 sheets).

U.S. Appl. No. 09/183,023, titled "Workstation" as filed on Oct. 30, 1998, including specification, claims, drawings and abstract (106 sheets).

U.S. Appl. No. 09/183,021, titled "Work Environment" as filed on Oct. 30, 1998, including specification, claims, drawings and abstract (101 sheets).

U.S. Appl. No. 09/260,474, titled "Information Display System" as filed on Mar. 1, 1999, including specification, claims, drawings and abstract (35 sheets).

U.S. Appl. No. 09/645,023, titled "Workstation" as filed on Aug. 23, 2000, including specification, claims, drawings and abstract (106 sheets). Preliminary Amendment filed Aug. 23, 2000 (40 sheets).

U.S. Appl. No. 09/571,521, titled "Information Display System" as filed on May 16, 2000, including specification, claims, drawings and abstract (103 sheets). Preliminary Amendment filed May 16, 2000 (19 sheets).

U.S. Appl. No. 09/650,210, titled "Work Environment" as filed on Aug. 29, 2000, including specification, claims, drawings and abstract (101 sheets). Preliminary Amendment filed Aug. 29, 2002 (32 sheets).

U.S. Appl. No. 09/669,913, titled "Display Board System" as filed on Sep. 25, 2000, including specification, claims, drawings and abstract (66 sheets). Preliminary Amendment filed Sep. 25, 2000 (36 sheets).

U.S. Appl. No. 09/563,098, titled "Display Board System" as filed on May 2, 2000, including specification, claims, drawings and abstract (113 sheets).

U.S. Appl. No. 09/182,999, titled "Display Board System" as filed on Oct. 30, 1998, including specification, claims, drawings and abstract (63 sheets).

U.S. Appl. No. 09/182,997, titled "Display Board System" as filed on Oct. 30, 1998, including specification, claims, drawings and abstract (64 sheets).

* cited by examiner

US 6,739,096 B2

MOVABLE OFFICE SUPPORT SYSTEM

CROSS-REFERENCE TO RELATED APPLICATIONS

The following patents and/or patent applications are hereby incorporated by reference: U.S. patent application Ser. No. 09/887,519 titled "MOVABLE SUPPORT SYSTEM" filed Jun. 22, 2001; U.S. patent application Ser. No. 09/183,023 titled "WORKSTATION" filed Oct. 30, 1998; now U.S. Pat. No. 6,374,547 issued on Apr. 23, 2002.

FIELD OF THE INVENTION

The present invention relates to an movable support system for use in an office environment. The present invention also relates to a support system that can be configured to provide at least one worksurface and/or display device that is movable within an office or work environment within a wide range of positions.

BACKGROUND

It is well-known to provide for a worksurface in a work space such as an office. In a typical application, a work space may have one or more worksurfaces that are installed in a "fixed" position, such as a table or desk or countertop. In such applications, such worksurfaces are installed in positions that are believed to be appropriate for most use conditions. However, it is not uncommon for a work space to be used by one or more workers or other persons in a wide variety of conditions, some of which find the "fixed" position of such worksurfaces to be beneficial, others which find the position acceptable, and others which may find the position tolerable (if not unacceptable).

It is also known to provide for a mobile worksurface, such as a mobile table, in a work space. In a common application, the mobile worksurface (alone or in conjunction with fixed worksurfaces), enhances the utility of a work space by providing greater flexibility and a greater range of use and other conditions. However, mobile worksurfaces—whether in use or not in use—typically require at least a portion of space within the work space, and at times may prove to be obstacles to occupants of the work space. The range of motion typically provided by such mobile worksurfaces is limited, for example to a particular plane or path of travel. In addition, mobile worksurfaces, typically provided with wheels or otherwise coupled to a fixed mounting structure, tend to lack the stability, size or "structure" typically provided with fixed worksurfaces. Moreover, mobile worksurfaces tend not to readily accommodate computing devices and/or display devices or other appliances and their associated cables (e.g. for power and/or data).

Accordingly, it would be advantageous to provide for a support system for a worksurface in a work space such as an office that is conveniently movable from one position to another position. It would also be advantageous to provide for a support system for a worksurface that provides a range of movement for the worksurface that covers a substantial portion of the work space. It would also be advantageous to provide for a support system for a worksurface that allows for movement within a horizontal plane and/or to various vertical positions within the work space. It would also be advantageous to provide for a support system for a worksurface that conveniently allows for association with a display device and thereby for convenient repositioning of the display device within a work space. It would also be advantageous to provide a support system for a work surface that provides for a wide range of motion and allows for a variety of orientations. It would further be advantageous to provide for a support system for a display device that can accommodate one or two or more display devices. It would further be advantageous to provide for a support system that provides for convenient management and interconnection of cables providing utilities to the appliances or equipment on a work surface or to a display device (or display devices). It would further be advantageous to provide for a support system that can readily be integrated with the articles of furniture within a work space.

It would be desirable to provide a system having any one or more of these or other advantageous features.

SUMMARY OF THE INVENTION

The present invention relates to a movable support system for use in a work space such as an office. The system includes a track system above at least a portion of the office and a support movably coupled to the track system and configured to project downward into the office and a worksurface coupled to the support. The worksurface may be brought into use in multiple locations about the office.

The present invention also relates to a movable support system for an office. The system includes an overhead track system configured to project over at least a portion of the office, a support slidingly suspended from the overhead track system and configured to hang downward into the office, and at least one display device coupled to the support. The work surface may be brought into use in multiple locations about the office.

The present invention further relates to a movable support system for a work space such as an office. The system includes a first elevated system configured to project over at least a portion of the office, a second elevated system cooperating with the first system and configured to project over at least a portion of the office. The system also includes a support assembly providing a support movable relative to the first system and configured to project downward into the office, a worksurface coupled to the support. The worksurface may be brought into use in multiple locations within the work space.

FIGURES

FIG. 1 is a perspective view of a support system in a work environment according to an exemplary embodiment.

FIG. 2 is a perspective view of a support system in a work environment according to an exemplary embodiment.

FIG. 3 is a perspective view of a support system in a work environment according to an exemplary embodiment.

FIG. 4 is a perspective view of a support system in a work environment according to an exemplary embodiment.

FIG. 5 is a perspective view of a support system in a work environment according to an exemplary embodiment.

FIG. 6 is a bottom perspective view of the system.

FIG. 7 is a top fragmentary perspective view of the system.

FIGS. 8A through 8C are perspective views of elements of the track assembly of the system according to a particularly preferred embodiment.

FIG. 9 is a perspective view of a support system in a work environment according to an alternative embodiment.

FIG. 10 is a perspective view of a support system in a work environment according to an alternative embodiment.

DETAILED DESCRIPTION OF EXEMPLARY EMBODIMENTS

Referring to FIGS. 1 through 5, a work space 20 is shown including a workstation 22 configurable for use by one or a plurality of workers or other persons. Workstation 22 includes a movable office support system 24 along with other articles of furniture such as storage units shown as wall shelving units 26 and corner shelving units 28. The work space also provides walls shown as partial height partition walls including base walls 30 and side walls 32 (e.g. partial walls). Movable office support system 24 is installed through an elevated track system 33 associated with base walls 30 movably coupled to an elevated rail system 34. Support system 24 also includes a support assembly 36 providing a support 38 which is coupled to a worksurface 40.

Work space 20 also provides a wide variety of information display panels 42 and 44 (see FIG. 2), lighting, privacy panels or screens, etc. Support system 24 is coupled within work space 20 for movement in a variety of horizontal and vertical directions to a variety of use and storage or stowed positions about or within work space 20 (for example, compare FIG. 1 with FIG. 5). As shown, support system 24 provides a worksurface 40; the support system may also provide one or more display panels 46. Also shown in work space 20 are chairs 48 (which can be of any conventional type, preferably mobile chairs).

Support assembly 36 includes a base or interface 50 coupled to rail system 34 for translating movement along a path of travel (e.g. linear or alternatively curved or other combinations of curved or linear paths at a fixed or variable height). Rail system 34 (shown as including two rails 52) is coupled to a track system 33 for translating movement along a path of travel. Track system 33 (shown as including tracks or guides 54 and braces 55, which coact with rails 52 to provide for controlled movement along track system 33) is installed upon a mounting structure or supporting members shown as walls 30. Support assembly 36 also includes a support 38 including a post 56 coupled to base 50. Support assembly 36 is coupled to a structure shown as worksurface 40; support assembly 36 is also shown as providing for attachment of an articulable structure or arm 57 (e.g. of any conventional type providing one or more "links" or "joints" for pivotal and/or translating movement) used to support an information display device shown as a display panel 46.

According to an exemplary embodiment, post 56 of support assembly 36 is pivotably coupled to base 50, for example to allow for rotation of worksurface 40 with respect to rail system 34 and/or track system 33. Support assembly 36 is also configured for movement of worksurface 40 with respect to base 50 in a vertical direction. According to a particularly preferenced embodiment, the vertical movement of worksurface 40 may be accomplished through the coaction of two or more vertically "telescoping" segments 58 comprising support assembly 36; the outside and inner diameters of telescoping segments 58 of support assembly 36; progressively decrease (e.g. so that the outside diameter of a second segment fits within the inside diameter of a first segment, and the outside diameter of a third segment fits within the inside diameter of the second segment, etc.). Support assembly 36 is also configured for translating movement with base 50 in range (e.g. horizontal plane) of travel with movement of base 50 within rail system 34 and of rail system 34 along track system 33.

According to any preferred embodiment the worksurface and/or a display device coupled to the support system (although not supported by the floor) can be adjusted in spatial position within a horizontal plane and in a vertical direction within the work space. In a "stowed" position, as shown in FIG. 5, worksurface 40 and/or a display device of support system 24 may be elevated (e.g. above a typical use height) and optionally at least partially concealed within a storage unit or other article of furniture. In any of the wide variety of "use" positions, worksurface 40 (and/or a display device) of support system 24 may be deployed and located within the substantial two- or three-dimensional range of motion provided by track system 33 and rail system 34 and rotatably and/or vertically adjustable support assembly 36. The position and orientation of each display device may also be adjusted by manipulation of the articulable arms.

As shown in FIGS. 6 and 7, according to a preferred embodiment, rail system 34 includes a bracket 60 providing wheels 62 which engage a slot 64 in track system 33; interface or base 50 of support assembly 36 includes plate 66 to which a set of roller guides 68 (shown in FIG. 8B) which engage rails 52 are coupled, so that track system 33 and rail system 34 are transverse and provide for orthogonal movement of support system 24 (e.g. in an X-Y plane). In FIGS. 8A through 8C, rails 52 and roller guide 68 of rail system 34 and base 50 of support assembly 36 are shown (along with mounting arrangements 70 and 72 for the rails) according to a particularly preferred embodiment. According to a particularly preferred embodiment, these elements are of a type commercially available from Unistrut Corporation of Itasca, Ill. (a Tyco International Ltd. Company). According to alternative embodiments, the elements of the track system and the rail system may be any of a wide variety of different types providing suitable range of motion, structural strength and interoperability for the intended application. Guides or stops (e.g. mechanical stops or the like) or a locking mechanism may also be installed on either or both of track system or rail system to constrain the path of travel of the support.

As shown in FIGS. 9 and 10, work space 20a may provide two support systems 24a and 24b each with a corresponding worksurface 40a and 40b. A cover 74 may be provided on rail system 34 for aesthetic purposes or to provide an internal passage (not visible) for cables (not shown); cover has an open path 76 to allow movement of support assembly 36. An outlet for utilities may also be provided on or adjacent to worksurfaces 40a and/or 40b (or on supports 38a and/or 38b)) so that appliances may be connected to utilities. (Cables 47 providing connection to utilities are shown schematically in FIG. 7 in relation to a passage through support assembly 36.)

According to any preferred embodiment, each articulable arm for coupling display device(s) to the support is selectively movable within a substantial range of motion. As shown, display devices shown as display panels 46 are coupled to arms 57 to allow suitably positioning and/or orientation for display of information in any of a variety of directions (e.g., up, down, laterally, pivotably) at each link or joint allowing articulation. The selective movement of base 50 and/or worksurface 40 and/or display panels 46 within work space 20 provides for substantial flexibility in the positioning and orientation and therefore use of worksurface 40 and/or one or more of display panels 46 within a range of motion within work space 20.

According to alternative embodiments, the support assembly may be configured for one information display device or two or more information display devices; the information display devices may be of any type, including flat display panels or other types of video monitors (e.g. CRT) or any other type of data or information display. The information display device may be associated with any type of appliance or device, such as a computing device or a television or network, etc.

In a conventional arrangement for associating a worksurface and/or display device within a work space, where the display device is positioned on a fixed worksurface, constraints are typically imposed upon the orientation of a user or users relative to the entrance of the work space or adjacent aisles or opportunities for potential shared zones for viewing the display device with others. For example, if the display device is positioned on a fixed worksurface to the back (or in one side or back corner) of the work space, the user of the work space may be constrained to work with her or his back to the entrance of the work space and information on the display device may be visible to those who enter the work space or walk along the adjacent aisle; if the display device is positioned on a fixed worksurface near the center or front of the work space, the user of the work space may be constrained to "work around" the worksurface and/or display device and may be less able to share information on the display device with those who enter the work space.

According to any preferred embodiment, the system will provide enhanced functionality in comparison with such conventional arrangements, and allow the worksurface and/or display device (or display devices) to be positioned selectively to enhance privacy or openness, or generally to facilitate the work to be performed in the work space; the system is intended to allow the repositioning (including physical placement and orientation) of the worksurface (and/or display device) to suit the needs of the worker. That is, according to any preferred embodiment of the system, the user or users (without having to adapt or adjust their own posture and/or position) will be able to adapt the positioning and orientation of the worksurface (and/or display device) for various use conditions.

According to other exemplary embodiments, the display devices may be associated with other articles of furniture and/or physical structures (such as panels, partitions, or walls). It is important to note that the term "article of furniture" is intended to be a broad term and not a term of limitation. The term "article of furniture," as used in this disclosure, may include, without limitation: systems furniture (e.g., partition wall systems, architectural walls, space frames, work stations, etc.), casegoods (e.g., file cabinets, storage bins, containers, closets, etc.), seating products (e.g., chairs, stools, lounges, etc.), work surfaces (e.g., tables, desk systems, credenzas, etc.), lighting systems, and other accessories.

It is important to note that the term "information" is intended to be a broad term and not a term of limitation. The term "information" may include information of any type or form or combination. It is also important to note that the terms "worksurface" and "work environment" are intended to be given broad scope and are terms of limitation. It is further important to note that the construction and arrangement of the elements of the system as shown in the preferred and other exemplary embodiments is illustrative only.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A movable support system for use in a work space such as an office, comprising:
   a track system above at least a portion of the office;
   a support movably coupled to the track system and configured to project downward into the office;
   a worksurface coupled to the support;
   wherein the worksurface may be brought into use in multiple locations about the office; and
   wherein the track system is supported at least in part by an article of furniture selected from the group consisting of a bookcase, a storage unit, a shelving unit, a file cabinet, and a credenza.

2. The system of claim 1 further comprising at least one display device coupled to the support.

3. The system of claim 1 further comprising at least one worksurface and at least one display device.

4. The system of claim 1 further comprising a rail system movably coupled to the track system and wherein the support is movably coupled to the track system through the rail system.

5. The system of claim 1 wherein the support is configured for vertical position adjustment of the worksurface.

6. The system of claim 5 wherein the support provides for telescopic height adjustment for the worksurface.

7. The system of claim 1 wherein the track system includes two overhead tracks.

8. The system of claim 7 wherein track system is linear.

9. The system of claim 7 wherein the track system is permanently mounted to a structure within the office.

10. The system of claim 7 wherein the track system is mounted on opposed walls of the office.

11. The system of claim 1 wherein the track system allows for placement of the support in a stowed position.

12. The system of claim 1 wherein the track system is elevated.

13. The system of claim 1 wherein the support is configured for management of cables providing utilities such as power or voice or data to the worksurface.

14. The system of claim 1 further comprising two display devices coupled to the support.

15. The system of claim 1 wherein at least one display device is directly coupled to the support.

16. The system of claim 4 wherein the rail system includes a cover.

17. The system of claim 1 wherein the worksurface is not supported on a floor of the office.

18. The system of claim 4 wherein the rail system is linear.

19. The system of claim 4 wherein the rail system provides a pair of rails and the support includes a base installed between the pair of rails.

20. The system of claim 5 wherein the support includes a vertical post to which the worksurface is coupled.

21. The system of claim 20 wherein the vertical post includes a first section and a second section and wherein the second section fits within the first section in a telescoping arrangement to allow for vertical position adjustment of the worksurface.

22. The system of claim 1 further comprising a pair of supports so that each support provides a worksurface.

23. The system of claim 4 wherein the track system is transverse to the rail system so that the support can be moved within a predetermined range of motion.

24. The system of claim 23 wherein the predetermined range of motion comprises at least half of the office.

25. The system of claim 17 wherein the worksurface can be stowed by movement to a predetermined position within the work space.

26. The system of claim 1 wherein the worksurface is pivotally coupled to the support.

27. The system of claim 1 wherein the worksurface can be moved in a horizontal direction and in a vertical direction within a predetermined range of motion.

28. The system of claim 1 further comprising an outlet adapted for interconnection of utilities such as power or data to an appliance associated with the worksurface.

29. The movable support system of claim 1 wherein the worksurface is fixed substantially parallel to a floor of the work space.

30. A movable support system for an office of a type having a floor, comprising:
   an overhead track system configured to project over at least a portion of the office;
   a support slidably suspended from the overhead track system and configured to hang downward into the office;
   at least one display device coupled to the support;
   a worksurface attached to the support;
   wherein the overhead track system is supported at least in part by an article of furniture selected from the group consisting of a bookcase, a storage unit, a shelving unit, a file cabinet, and a credenza; and
   wherein the worksurface may be brought into use in multiple locations about the office.

31. The movable support system of claim 30 wherein the worksurface can be stowed by movement to a predetermined position with the office.

32. The movable support system of claim 30 wherein the worksurface can be stowed within a storage unit.

33. The movable support system of claim 30 wherein the worksurface is fixed substantially parallel to the floor.

34. The system of claim 30 further comprising a rail system movably coupled to the track system and wherein the support is movably coupled to the track system through the rail system.

35. The system of claim 30 wherein the support is configured for vertical position adjustment of the display device.

36. The system of claim 30 wherein track system includes two overhead tracks.

37. The system of claim 36 wherein track system is linear.

38. The system of claim 36 wherein the track system is permanently mounted to a structure within the office.

39. The system of claim 35 wherein the support is configured for management of cables providing utilities such as power or voice or data to the worksurface.

40. The system of claim 30 further comprising two display devices coupled to the support.

41. The system of claim 30 further comprising a rail system providing a pair of rails and wherein the support includes an interface installed between the pair of rails.

42. The system of claim 35 wherein the support includes a vertical post to which the worksurface is coupled.

43. The system of claim 42 wherein the vertical post includes a first section and a second section and wherein the second section fits within the first section in a telescoping arrangement to allow for vertical position adjustment of the worksurface.

44. The system of claim 30 further comprising a pair of supports so that each support provides a worksurface.

45. The system of claim 30 wherein the worksurface is pivotally coupled to the support.

46. The system of claim 45 wherein the worksurface can be moved both in a horizontal direction and in a vertical direction within a predetermined range of motion.

47. A movable support system for a work space such as an office, comprising:
   a first elevated system that includes a track system configured to project over at least a portion of the office;
   a second elevated system cooperating with the first system and configured to project over at least a portion of the office;
   a support assembly movable relative to the first system and configured to project downward into the office;
   a worksurface coupled to the support assembly;
   wherein the track system is supported at least in part by an article of furniture selected from the group consisting of a bookcase, a storage unit, a shelving unit, a file cabinet, and a credenza; and
   wherein the worksurface may be brought into use in multiple locations within the work space.

48. The system of claim 47 wherein the second elevated system is a rail system.

49. The system of claim 47 wherein the first system and second system are movably coupled in an orthogonal arrangement and the support includes a coupling member movably coupled to the rail system.

50. The system of claim 47 further comprising at least one display device coupled to the support.

51. The system of claim 47 further comprising a rail system movably coupled to the track system and wherein the support is movably coupled to the track system through the rail system.

52. The system of claim 47 wherein the support assembly is configured for vertical position adjustment of the worksurface.

53. The system of claim 52 wherein the support assembly provides for telescopic height adjustment for the worksurface.

54. The system of claim 47 wherein the track system includes two overhead tracks.

55. The system of claim 54 wherein track system is linear.

56. The system of claim 54 wherein the track system is permanently mounted to a structure within the office.

57. The system of claim 54 wherein the track system is mounted on opposed walls of the office.

58. The system of claim 47 wherein the track system allows for placement of the support in stowed position.

59. The system of claim 47 wherein the support assembly is configured for management of cables providing utilities such as power or voice or data to the worksurface.

60. The system of claim 47 further comprising two display devices coupled to the support assembly.

61. The system of claim 50 wherein at least one display device is directly coupled to the support assembly.

62. The system of claim 51 wherein the rail system includes a cover.

63. The system of claim 47 wherein the worksurface is not supported on a floor of the office.

64. The system of claim 47 wherein the rail system is linear.

65. The system of claim 51 wherein the rail system provides a pair of rails and the support assembly includes a base installed between the pair of rails.

66. The system of claim 52 wherein the support assembly includes a vertical post to which the worksurface is coupled.

67. The system of claim 66 wherein the vertical post includes a first section and a second section and wherein the second section fits within the first section in a telescoping arrangement to allow for vertical position adjustment of the worksurface.

68. The system of claim 47 further comprising a pair of support assemblies so that each support assembly provides a worksurface.

69. The system of claim 54 wherein the track system is transverse to the rail system so that the support can be moved within a predetermined range of motion.

70. The system of claim 47 wherein the predetermined range of motion comprises at least half of the office.

71. The system of claim 58 wherein the worksurface can be stowed by movement to a predetermined position within the work space.

72. The system of claim 47 wherein the worksurface is pivotally coupled to the support.

73. The system of claim 47 wherein the worksurface can be moved in a horizontal direction and in a vertical direction within a predetermined range of motion.

74. The movable support system of claim 47 wherein the worksurface is fixed substantially parallel to a floor of the work space.

* * * * *